(12) United States Patent
Iwama et al.

(10) Patent No.: US 8,383,272 B2
(45) Date of Patent: Feb. 26, 2013

(54) ANODE CURRENT COLLECTOR, ANODE, AND SECONDARY BATTERY

(75) Inventors: Masayuki Iwama, Fukushima (JP); Kenichi Kawase, Fukushima (JP)

(73) Assignee: Sony Corporation, Tokyo (JP)

( * ) Notice: Subject to any disclaimer, the term of this patent is extended or adjusted under 35 U.S.C. 154(b) by 658 days.

(21) Appl. No.: 12/604,114

(22) Filed: Oct. 22, 2009

(65) Prior Publication Data

US 2010/0104951 A1   Apr. 29, 2010

(30) Foreign Application Priority Data

Oct. 24, 2008   (JP) ................. 2008-274562

(51) Int. Cl.
*H01M 4/66* (2006.01)
*H01M 4/68* (2006.01)
*H01M 4/64* (2006.01)
*H01M 4/02* (2006.01)

(52) U.S. Cl. .......... 429/245; 429/233; 429/209

(58) Field of Classification Search .......... 429/245, 429/233, 209
See application file for complete search history.

(56) References Cited

U.S. PATENT DOCUMENTS

| 2004/0200727 A1* | 10/2004 | Aiba et al. ............ 205/157 |
| 2006/0115739 A1* | 6/2006 | Yamaguchi et al. ........ 429/326 |
| 2008/0220337 A1* | 9/2008 | Kawase et al. ............ 429/338 |

FOREIGN PATENT DOCUMENTS

| JP | 2002-313319 | 10/2002 |
| JP | 2008-004462 | 1/2008 |
| WO | 01/31723 | 5/2001 |

* cited by examiner

*Primary Examiner* — Helen O Conley
(74) *Attorney, Agent, or Firm* — K&L Gates LLP

(57) ABSTRACT

A secondary battery that has superior safety and is able to provide more favorable cycle characteristics is provided. A laminated body in which a cathode and an anode are layered with a separator impregnated with an electrolytic solution in between is contained in a package can and a package cup. In the anode, an anode active material layer containing an anode active material such as silicon is provided on an anode current collector in which projection sections are formed on a base material. The base material contains carbon and sulfur respectively having a content ratio of 100 ppm or less, and contains crystallites having an average diameter of from 0.01 μm to 5 μm both inclusive.

7 Claims, 7 Drawing Sheets

_US 8,383,272 B2_

ANODE CURRENT COLLECTOR, ANODE, AND SECONDARY BATTERY

CROSS REFERENCES TO RELATED APPLICATIONS

The present application claims priority to Japanese Priority Patent Application JP 2008-274562 filed in the Japan Patent Office on Oct. 24, 2008, the entire content of which is hereby incorporated by reference.

BACKGROUND

The present disclosure relates to an anode current collector containing an electrolytic copper foil, an anode using the same, and a secondary battery using the same.

In recent years, as portable electronic devices such as a video tape recorder (VTR), a mobile phone, and a mobile computer have been sophisticated and multi-functionalized, a higher capacity of secondary batteries as a power source for these portable electronic devices has been demanded. In the lithium ion secondary battery using graphite for the anode that is generally used currently, the technology thereof has been matured. Thus, the battery capacity thereof is in a saturated state and it is difficult to vastly increase the capacity thereof. Therefore, it is considered to use silicon for the anode. Recently, forming an anode active material layer on an anode current collector by vapor-phase deposition method or the like has been reported. Silicon is largely expanded and shrunk associated with charge and discharge, and thus there has been a problem that the cycle characteristics are lowered due to pulverization. However, if the vapor-phase deposition method is used, such pulverization is able to be inhibited, and the anode current collector and the anode active material layer are able to be integrated. In result, electron conductivity in the anode becomes extremely favorable, and high performance both in the capacity and the cycle life is expected.

However, there has been a problem that even in the anode in which the anode current collector and the anode active material layer are integrated as above, if charge and discharge are repeated, intense expansion and shrinkage of the anode active material layer cause a stress between the anode current collector and the anode active material layer, for example, the anode active material layer is dropped, leading to lowering of the cycle characteristics. Therefore, it has been already considered that the contact characteristics between the anode active material layer and the anode current collector are improved by roughening the surface of the anode current collector (for example, refer to WO 01/031723 pamphlet and Japanese Unexamined Patent Application Publication No. 2002-313319).

However, in the case where the thickness and the volume density of the anode active material layer are increased or the thickness of the anode current collector is decreased in order to further increase the capacity, due to expansion and shrinkage of the anode active material layer, the anode current collector is elongated and distorted. In result, there is a possibility that it leads to deterioration of the cycle characteristics. Further, in the case where the thickness and the volume density of the anode active material layer are increased, the heat value of the anode active material layer in charge and discharge is increased. Thus, from a safety standpoint, it is necessary to inhibit temperature rise of the battery by increasing heat release efficiency of the anode current collector. In the case where the thickness of the anode current collector is decreased, the heat release efficiency is lowered or the electric resistance is increased, resulting in tendency that the heat value of the anode current collector itself is increased. Thus, it is necessary to inhibit temperature rise of the battery by increasing heat release efficiency of the anode current collector as well.

In view of the foregoing disadvantages, it is desirable to provide an anode current collector with a higher mechanical strength and superior heat release characteristics. Further, it is desirable to provide an anode and a secondary battery that include the foregoing anode current collector and have superior cycle characteristics and high safety.

SUMMARY

According to an embodiment, there is a provided an anode current collector made of an electrolytic copper foil which contains carbon and sulfur respectively having a content ratio of 100 ppm or less, and in which an average diameter of crystallites is from 0.01 µm to 5 µm both inclusive.

According to an embodiment, there is a provided an anode in which an anode active material layer is provided on the foregoing anode current collector of the embodiment of the invention.

According to an embodiment, there is a provided a secondary battery including a cathode, the foregoing anode of the embodiment of the invention, and an electrolyte.

In the anode current collector of the embodiment, the electrolytic copper foil which contains a given amount of carbon and a given amount of sulfur and which contains the crystallites having an average diameter of from 0.01 µm to 5 µm both inclusive is used. Thus, a lower volume resistivity and a higher tensile strength are obtained. Therefore, in the anode and the secondary battery of the embodiments of the invention including the anode current collector, extension and strain of the anode current collector associated with swollenness and shrinkage of the anode active material layer in charge and discharge are hardly generated, and the contact characteristics between the anode current collector and the anode active material layer and the current collectivity are favorably retained. Further, since the heat release characteristics of the anode current collector are high, heat rise of the anode and the secondary battery in charge and discharge is inhibited.

According to the anode current collector of the embodiment, while the volume resistivity is decreased, the tensile strength is able to be improved. Thus, according to the anode and the secondary battery of the embodiments including the anode current collector, superior cycle characteristics and high safety are able to be secured.

Additional features and advantages are described herein, and will be apparent from the following Detailed Description and the figures.

DETAILED DESCRIPTION

An embodiment will be hereinafter described in detail with reference to the drawings. In the figures, a shape, a size, and an arrangement relation of each element are schematically illustrated to the degree with which the invention is able to be understood, and are different from each actual size.

Figure 1:
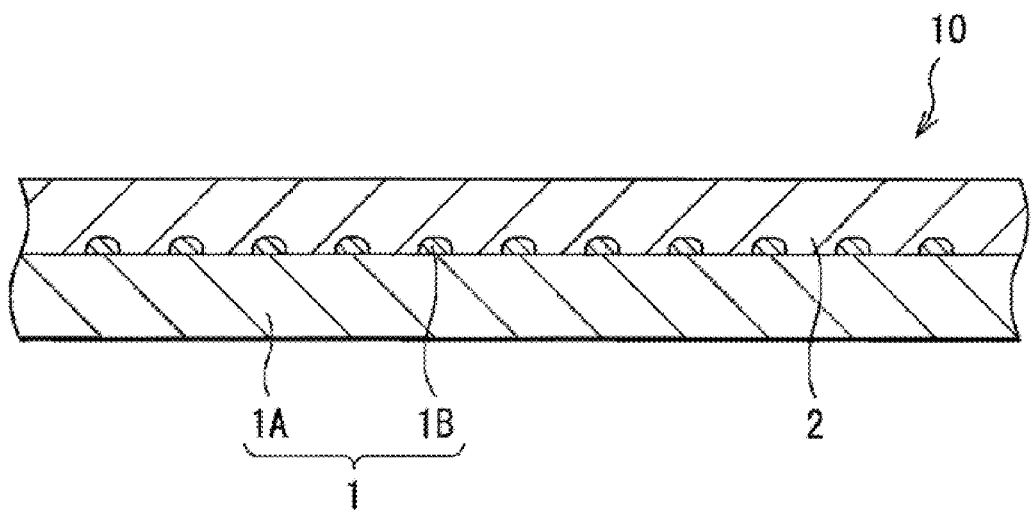
FIG. 1 is a cross sectional view illustrating a structure of an anode according to an embodiment.

FIG. 1 illustrates a cross sectional structure of an anode 10 as an embodiment. The anode 10 has a structure in which, for example, an anode active material layer 2 containing an anode active material such as silicon (Si) is provided on an anode current collector 1. The anode active material layer 2 may be formed on both faces of the anode current collector 1, or may be formed only on a single face thereof.

In the anode current collector 1, a particulate projection section 1B is provided on the surface of a base material 1A on which the anode active material layer 2 is formed. That is, the surface of the anode current collector 1 is concavo-convex. Due to superior anchor effect by the projection section 1B, the contact characteristics between the anode current collector 1 and the anode active material layer 2 are improved. Accordingly, dropping, exfoliation, and pulverization of the anode active material layer 2 due to expansion and shrinkage of the anode active material associated with charge and discharge are inhibited.

The base material 1A is made of a metal foil (electrolytic copper foil) that has a favorable mechanical strength and favorable electrochemical stability and is mainly composed of copper (Cu) having high electric conductivity. Since copper is a metal element that has high electric conductivity and does not form an intermetallic compound with lithium generally used as an electrode reactant, copper is a preferable material as the base material 1A. The electrolytic copper foil composing the base material 1A contains a plurality of crystallites, and the average diameter thereof is from 0.01 μm to 5 μm both inclusive. Further, the electrolytic copper foil contains carbon (C) and sulfur (S) respectively having a content ratio of 100 ppm or less. Carbon (C) and sulfur (S) exist, for example, as a particle in a gap among crystallites of copper.

The thickness of the base material 1A is preferably, for example, 25 μm or less. If the thickness of the base material 1A is excessively large, a stress generated between the anode current collector 1 and the anode active material layer 2 associated with expansion and shrinkage of the anode active material layer 2 in charge and discharge becomes large. Further, the thickness of the base material 1A is preferably 8 μm or more. If the thickness of the base material 1A is excessively small, ability to mechanically support the anode active material layer 2 is lowered and bend (wrinkle) is easily generated in charge and discharge. The base material 1A may be composed of a single layer, or may be composed of a plurality of layers. The tensile strength of the base material 1A is preferably, for example, 400 N/mm$^2$ or more. Thereby, contact characteristics between the anode current collector 1 and the anode active material layer 2 and current collectivity are more improved. Further, the volume resistivity of the base material 1A is preferably from 2.0 μΩ·cm to 3.0 μΩ·cm both inclusive. If the volume resistivity of the base material 1A is lower than 2.0 μΩ·cm, a sufficient tensile strength is hardly obtained. Meanwhile, if the volume resistivity of the base material 1A exceeds 3.0 μΩ·cm, sufficient heat release characteristics are hardly obtained.

Further, it is preferable that out of the plurality of crystallites in the base material 1A, crystallites satisfying the following Conditional expression 1 and Conditional expression 2 occupy 90 volume % or more of the base material 1A.

$0 < f < 0.5$  Conditional expression 1

$f = (a-b)/a$  Conditional expression 2

In Conditional expressions 1 and 2, f represents a tire profile, a represents the maximum diameter of a crystallite, and b represents the minimum diameter of the crystallite.

Further, it is particularly preferable that crystallites satisfying the following Conditional expression 3 (that is, crystallites having an extremely low tire profile) occupy 90 volume % or more of the base material 1A, since thereby a higher tensile strength is obtained.

$0 < f \leq 0.1$  Conditional expression 3

To obtain a higher tensile strength, the crystallites are preferably oriented so that the maximum diameter direction is a direction other than the direction perpendicular to the surface of the base material 1A. Orientation of the crystallites is able to be controlled by adjusting the density size of a current applied to a plating bath in forming the base material 1A by electrolytic precipitation method.

The projection section 1B is a metal fine particle such as copper, which is precipitated by, for example, electrolytic precipitation method. Otherwise, the projection section 1B may be anchored to the surface of the base material 1A by sintering. The projection section 1B is intended to improve the contact characteristics between the anode current collector 1 and the anode active material layer 2 by the anchor effect as described above. In addition, the projection section 1B is intended to diffuse cracks generated in the anode active material layer 2 associated with charge and discharge in various directions to decease the cracks. The shape of the projection section 1B may be any shape such as a sphere and a rectangle. The average diameter of the projection section 1B is desirably, for example, from 0.5 μm to 5.0 μm both inclusive. Further, it is preferable that as a result of existence of the plurality of projection sections 1B on the surface of the base material 1A, the surface roughness of the anode current collector 1 becomes from 3.2 μm to 5.2 μm both inclusive based on the ten point height of roughness profile Rz value. If the foregoing conditions are satisfied, while the contact characteristics between the anode current collector 1 and the anode active material layer 2 are sufficiently improved, the internal stress generated in the anode active material layer 2 is able to be effectively relaxed.

A plating film (not illustrated) covering the base material 1A and the projection section 1B may be provided between the anode current collector 1 and the anode active material layer 2. The plating film preferably contains an element capable of being alloyed with the anode active material layer 2. Thereby, alloying of the anode current collector 1 and the anode active material layer 2 is promoted, and the contact characteristics are more improved. In particular, the material of the plating film preferably has a higher mechanical strength than that of copper, for example, the material is preferably a metal containing one or more selected from the group consisting of simple substances and compounds of cobalt (Co), iron (Fe), and nickel (Ni). An oxide film may be provided on the surface of the plating film.

The anode active material layer 2 contains one or more anode materials capable of inserting and extracting an electrode reactant as an anode active material. The anode active material layer 2 is preferably alloyed with the anode current collector 1 in at least part of the interface thereof. Specifically, it is preferable that at the interface thereof, the element of the anode current collector 1 is diffused in the anode active material layer 2; the element of the anode active material is diffused in the anode current collector 1; or these elements are diffused in each other. That is, the anode active material layer 2 is preferably alloyed with the anode current collector 1 in at least part of the interface between the anode active material layer 2 and the projection section 1B (or the plating film (not illustrated)). Thereby, destruction due to expansion and shrinkage of the anode active material layer 2 in charge and discharge is inhibited, and the electron conductivity between the anode current collector 1 and the anode active material layer 2 is improved. Such alloying is often generated at the same time as forming the anode active material layer 2 by after-mentioned vapor-phase deposition method, liquid-phase deposition method, or firing method. However, such alloying may be further generated by providing heat treatment. In this specification, the foregoing diffusion of elements is also regarded as a mode of alloying.

Examples of anode materials capable of inserting and extracting lithium include a material that is capable of inserting and extracting lithium and has one or more of metal elements and metalloid elements as an element, since a high energy density is thereby obtained. Such an anode material may be a simple substance, an alloy, or a compound of a metal element or a metalloid element, or may have one or more phases thereof at least in part.

In the invention, "alloys" include an alloy containing one or more metal elements and one or more metalloid elements, in addition to an alloy composed of two or more metal elements. Further, "alloy" in the invention may contain a non-metallic element. The structure thereof includes a solid solution, a eutectic crystal (eutectic mixture), an intermetallic compound, and a structure in which two or more thereof coexist.

Examples of the foregoing metal elements or the foregoing metalloid elements include a metal element or a metalloid element capable of forming an alloy with lithium. Specific examples thereof include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), and platinum (Pt). Specially, one or both of silicon and tin are preferable, and silicon is more preferable. Silicon has a high ability to insert and extract lithium, and provides a high energy density.

Examples of anode materials having one or both of silicon and tin include the simple substance, an alloy, or a compound of silicon; the simple substance, an alloy, or a compound of tin; and a material having one or more phases thereof at least in part. One thereof may be used singly, or a plurality thereof may be used by mixture.

Examples of anode materials having the simple substance of silicon include a material having the simple substance of silicon as a main component. The anode active material layer 2 containing such an anode material has, for example, a structure in which a second element other than silicon and oxygen exist between layers composed of the silicon simple substance. The total content of silicon and oxygen in the anode active material layer 2 is preferably 50 wt % or more, and in particular, the content of silicon simple substance is preferably 50 wt % or more. Examples of the second element other than silicon include titanium (Ti), chromium (Cr), manganese (Mn), iron, cobalt, nickel, copper, zinc (Zn), indium, silver, magnesium, aluminum, germanium, tin, bismuth, and antimony (Sb). The anode active material layer 2 containing the material having the silicon simple substance as a main component is able to be formed by, for example, co-evaporating silicon and other element.

Examples of alloys of silicon include an alloy having one or more selected from the group consisting of tin, nickel, copper, iron, cobalt, manganese, zinc, indium, silver, titanium, germanium, bismuth, antimony, and chromium as the second element other than silicon. Examples of compounds of silicon include a compound having oxygen or carbon, and such a compound may have the foregoing second element in addition to silicon. Examples of alloys or compounds of silicon include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v\leq2$), and LiSiO.

Examples of alloys of tin include an alloy having one or more selected from the group consisting of silicon, nickel, copper, iron, cobalt, manganese, zinc, indium, silver, titanium, germanium, bismuth, antimony, and chromium as the second element other than tin. Examples of compounds of tin include a compound having oxygen or carbon, and such a compound may have the foregoing second element in addition to tin. Examples of alloys or compounds of tin include $SnO_w$ ($0<w\leq2$), $SnSiO_3$, LiSnO, and $Mg_2Sn$.

In particular, as an anode material having one or both of silicon and tin, an anode material having the second element and a third element in addition to tin as a first element is preferable. The second element is one or more selected from the group consisting of cobalt, iron, magnesium, titanium, vanadium (V), chromium, manganese, nickel, copper, zinc, gallium, zirconium, niobium (Nb), molybdenum (Mo), silver, indium, cerium (Ce), hafnium, tantalum (Ta), tungsten (W), bismuth, and silicon. The third element is one or more selected from the group consisting of boron, carbon, aluminum, and phosphorus (P). In the case where the second element and the third element are contained, the cycle characteristics are improved if the anode is used for an electrochemical device such as a secondary battery.

Specially, an SnCoC-containing material that has tin, cobalt, and carbon as an element in which the carbon content is from 9.9 wt % to 29.7 wt % both inclusive, and the cobalt ratio to the total of tin and cobalt (Co/(Sn+Co)) is from 30 wt % to 70 wt % both inclusive is preferable. In such a composition range, a high energy density is able to be obtained.

The SnCoC-containing material may further have other element according to needs. Examples of other elements include silicon, iron, nickel, chromium, indium, niobium, germanium, titanium, molybdenum, aluminum, phosphorus, gallium, and bismuth. Two or more thereof may be contained, since thereby higher effect is obtained.

The SnCoC-containing material has a phase containing tin, cobalt, and carbon. Such a phase is preferably a low crystalline phase or an amorphous phase. The phase is a reaction phase capable of being reacted with lithium, and superior cycle characteristics are thereby obtained. The half bandwidth of the diffraction peak obtained by X-ray diffraction of the phase is preferably 1.0 deg or more based on diffraction angle of 2θ in the case where CuKα ray is used as a specific X ray, and the insertion rate is 1 deg/min. Thereby, lithium is more smoothly inserted and extracted, and reactivity with the electrolytic solution is decreased if the anode is used for an electrochemical device such as a secondary battery including the electrolytic solution.

It is easily determined whether or not the diffraction peak obtained by X-ray diffraction corresponds to the reaction phase capable of being reacted with lithium by comparing an X-ray diffraction chart before the electrochemical reaction with lithium to an X-ray diffraction chart after the electrochemical reaction with lithium. For example, if the diffraction peak position in the X-ray diffraction chart after the electrochemical reaction with lithium is changed from the diffraction peak position in the X-ray diffraction chart before the electrochemical reaction with lithium, the diffraction peak obtained by X-ray diffraction of the phase corresponds to the reaction phase capable of being reacted with lithium. In this case, for example, the diffraction peak of the low crystalline or amorphous reaction phase is shown in the range from $2\theta$=from 20 deg to 50 deg both inclusive. The low crystalline or amorphous reaction phase contains, for example, the foregoing respective elements. The low crystalline or amorphous reaction phase may be mainly realized by carbon.

The SnCoC-containing material may have a phase having a simple substance of each element or part thereof, in addition to the low crystalline or the amorphous phase.

In particular, in the SnCoC-containing material, at least part of carbon as an element is preferably bonded with a metal element or a metalloid element as other element. Cohesion or crystallization of tin or the like is thereby inhibited.

Examples of measurement methods for examining bonding state of elements include X-ray Photoelectron Spectroscopy (XPS). XPS is a method for examining element composition and element bonding state in the region up to several nm from the sample surface by irradiating the sample surface with soft X ray (in a commercial device, Al—K$\alpha$ ray or Mg—K$\alpha$ ray is used) and measuring motion energy of a photoelectron jumping out from the sample surface.

The bound energy of an inner orbit electron of an element is changed correlatively to the charge density on the element in an initial approximate manner. For example, in the case where the charge density of carbon element is decreased by interaction with an element existing in the vicinity thereof, an outer orbit electron such as 2p electron is decreased, and thus 1s electron of carbon element is subject to strong binding force by the orbit. That is, in the case where the charge density of the element is decreased, the bound energy becomes high. In XPS, in the case where the bound energy becomes high, the peak is shifted to a higher energy region.

In XPS, in the case of graphite, the peak of 1s orbit of carbon (C1s) is shown in 284.5 eV in the apparatus in which energy calibration is made so that the peak of 4f orbit of gold atom (Au4f) is obtained in 84.0 eV. In the case of surface contamination carbon, the peak is shown in 284.8 eV. Meanwhile, in the case of higher charge density of carbon element, for example, if carbon is bonded with an element that is more positive than carbon, the peak of C1s is shown in the region lower than 284.5 eV. That is, in the case where at least part of carbon contained in the SnCoC-containing material is bonded with the metal element or the metalloid element as other element, the peak of the composite wave of C1s obtained for the SnCoC-containing material is shown in the region lower than 284.5 eV.

In performing XPS measurement, in the case where the surface is covered with surface contamination carbon, the surface is preferably slightly sputtered by an argon ion gun attached to an XPS device. Further, if the anode having the SnCoC-containing material as a measuring target exists in an electrochemical device such as a secondary battery including an electrolytic solution, it is preferable that after the electrochemical device is disassembled and the anode is taken out, the anode is preferably washed with a volatile solvent such as dimethyl carbonate in order to remove a low volatile solvent and an electrolyte salt existing on the surface of the anode. Such sampling is preferably performed under the inactive atmosphere.

Further, in XPS measurement, for example, the peak of C1s is used for calibrating the energy axis of spectrums. Since surface contamination carbon generally exists on a material surface, the peak of C1s of the surface contamination carbon is set to in 284.8 eV, which is used as an energy reference value. In XPS measurement, the waveform of the peak of C1s is obtained as a form including the peak of the surface contamination carbon and the peak of carbon in the SnCoC-containing material. Therefore, for example, by performing analysis by using commercially available software, the peak of the surface contamination carbon and the peak of carbon in the SnCoC-containing material are separated. In the analysis of the waveform, the position of the main peak existing on the lowest bound energy side is set to the energy reference value (284.8 eV).

The SnCoC-containing material is able to be formed by, for example, mixing raw materials of respective elements, dissolving the resultant mixture in an electric furnace, a high frequency induction furnace, an arc melting furnace or the like and then solidifying the resultant. Otherwise, the SnCoC-containing material may be formed by various atomization methods such as gas atomizing and water atomizing; various roll methods; a method using mechanochemical reaction such as mechanical alloying method and mechanical milling method or the like. Specially, the method using mechanochemical reaction is preferable, since thereby the SnCoC-containing material becomes the low crystalline structure or the amorphous structure. In the method using the mechanochemical reaction, for example, a manufacturing apparatus such as a planetary ball mill apparatus and an attliter is able to be used.

As the raw material, a mixture of simple substances of the respective elements may be used, but an alloy is preferably used for part of elements other then carbon. In the case where carbon is added to the alloy and thereby the material is synthesized by the method using mechanical alloying method, the low crystalline structure or the amorphous structure is obtained and reaction time is shortened as well. The state of the raw material may be powder or a mass.

In addition to the SnCoC-containing material, an SnCoFeC-containing material having tin, cobalt, iron, and carbon as an element is also preferable. The composition of the SnCoFeC-containing material is able to be voluntarily set. For example, as a composition in which the iron content is set small, it is preferable that the carbon content is from 9.9 wt % to 29.7 wt % both inclusive, the iron content is from 0.3 wt % to 5.9 wt % both inclusive, and the cobalt ratio to the total of tin and cobalt (Co/(Sn+Co)) is from 30 wt % to 70 wt % both inclusive. Further, for example, as a composition in which the iron content is set large, it is preferable that the carbon content is from 11.9 wt % to 29.7 wt % both inclusive, the ratio of the total of cobalt and iron to the total of tin, cobalt, and iron ((Co+Fe)/(Sn+Co+Fe)) is from 26.4 wt % to 48.5 wt % both inclusive, and the cobalt ratio to the total of cobalt and iron (Co/(Co+Fe)) is from 9.9 wt % to 79.5 wt % both inclusive. In such a composition range, a high energy density is obtained. The crystallinity of the SnCoFeC-containing material, the measurement method for examining bonding state of elements, the forming method of the SnCoFeC-containing material and the like are similar to those of the foregoing SnCoC-containing material.

The anode active material layer 2 using the simple substance, an alloy, or a compound of silicon; the simple substance, an alloy, or a compound of tin; or a material having one or more phases thereof at least in part as the anode material capable of inserting and extracting lithium is, for example, formed by using vapor-phase deposition method, liquid-phase deposition method, spraying method, coating method, firing method, or a combination of two or more of these methods. Examples of vapor-phase deposition method include physical deposition method or chemical deposition method, and specifically vacuum evaporation method, sputtering method, ion plating method, laser ablation method, thermal Chemical Vapor Deposition (CVD) method, and plasma CVD method. As liquid-phase deposition method, a known technique such as electrolytic plating or electroless plating is able to be used. Coating method is a method in which, for example, after a particulate anode active material is mixed with a binder and the like, the resultant mixture is dispersed in a solvent and then coating is provided. Firing method is, for example, a method in which after coating is provided by coating method, heat treatment is provided at temperature higher than the melting point of the binder or the like. Examples of firing method include a known technique such as atmosphere firing method, reactive firing method, and hot press firing method.

The anode 10 is manufactured, for example, as follows.

First, as the base material 1A, an electrolytic copper foil is formed as follows. More specifically, a stainless steel plate as an anode and a copper plate as a cathode are let into a container containing a given plating bath. While the plating bath is retained at given temperature, a current is applied for given time at a given current density. Thereby, the electrolytic copper foil having a given thickness is precipitated on the surface of the copper plate. As the plating bath, for example, a plating bath containing copper sulfate pentahydrate ($CuSO_4 \cdot 5H_2O$), sulfuric acid, copper chloride, and an organic compound generally used as an additive (for example, polyethylene glycol, 3-3'-dithiobis (1-propanesulfonic acid) sodium and the like) is used. If the composition ratio of the plating bath is adjusted to increase the concentration of chloride ions, dimensions of the crystallites are able to be increased. Meanwhile, if the composition ratio of the plating bath is adjusted to decrease the concentration of chloride ions, dimensions of the crystallites are able to be decreased. Further, as described above, the orientation of the crystallites is able to be controlled by adjusting the density size of the current applied to the plating bath. Subsequently, the particulate projection section 1B is formed on the surface of the base material 1A by, for example, vapor-phase deposition method or liquid-phase deposition method (for example, electrolytic precipitation method). Otherwise, powder composed of metal fine particles is dissolved in a given solvent to form a slurry, the base material 1A is coated with the slurry and then the resultant is sintered. Thereby, the particulate projection section 1B is provided on the surface of the base material 1A. At this time, the shape of the metal fine particle is not limited to a spherical shape, but may be in the shape of a rock or a block, or may be in other shape. Further, it is possible that after the projection section 1B is formed by the foregoing method, heat treatment is performed under the vacuum atmosphere or the non-oxidizing atmosphere and thereby alloying in the interface between the base material 1A and the projection section 1B is promoted. By forming such a projection section 1B, concavo-convex shape is shown on the surface of the base material 1A.

After that, the plating film that links the projection section 1B with the base material 1A may be formed by plating treatment so as not to ruin the concavo-convex shape. The plating treatment is the so-called covering plating to form not a particulate plating film but a dense plating film. At this time, it is desirable that the plating film wholly covers over the surface of the base material 1A and the surroundings of the projection section 1B. However, it is possible that the plating film is provided in part of the surface of the base material 1A and part of the surroundings of the projection section 1B. Accordingly, the anode current collector 1 is obtained.

After the anode current collector 1 is formed, the anode active material layer 2 is formed by depositing the anode active material containing the foregoing anode material on the anode current collector 1 by vapor-phase deposition method or liquid-phase deposition method. Otherwise, it is possible that after a precursor layer containing a particulate anode active material is formed on the anode current collector 1, the resultant is fired by firing method to form the anode active material layer 2. Otherwise, the anode active material layer 2 may be formed by a combination of two or three methods out of vapor-phase deposition method, liquid-phase deposition method, and firing method. By forming the anode active material layer 2 by using one or more selected from the group consisting of vapor-phase deposition method, liquid-phase deposition method, and firing method, the anode active material layer 2 is alloyed with the anode current collector 1 in at least part of the interface with the anode current collector 1. In order to further alloy the interface between the anode current collector 1 and the anode active material layer 2, the heat treatment under the vacuum atmosphere or the non-oxidizing atmosphere is preferably performed additionally.

As vapor-phase deposition method, for example, physical deposition method or chemical deposition method is able to be used. Specifically, vacuum evaporation method, sputtering method, ion plating method, laser ablation method, thermal Chemical Vapor Deposition (CVD) method, plasma CVD method and the like are able to be used. As liquid-phase deposition method, a known technique such as electrolytic plating or electroless plating is able to be used. For sintering method, a known technique such as atmosphere sintering method, reactive sintering method, or hot press sintering method is able to be used. Accordingly, the anode 10 is completed.

According to the anode current collector 1 of this embodiment, as the base material 1A, the electrolytic copper foil that contains a given amount of carbon and a given amount of sulfur and that contains the crystallites having an average diameter from 0.01 μm to 5 μm both inclusive is used. Thus, a lower volume resistivity and a higher tensile strength are obtained. In result, in the anode 10 including the anode current collector 1A, extension and strain of the anode current collector associated with expansion and shrinkage of the anode active material layer in charge and discharge are hardly generated, and the contact characteristics between the anode current collector 1 and the anode active material layer 2 and the current collectivity are favorably retained. Further, since the heat release characteristics of the anode current collector 1 are high, heat rise of the anode 10 in charge and discharge is inhibited.

Further, in the anode 10, since the projection section 1B made of copper is provided on the surface of the base material 1A in the anode current collector 1. Thus, the contact area between the anode current collector 1 and the anode active material layer 2 is increased, and the contact characteristics in between are more improved. In addition, the internal stress generated in the anode active material layer 2 generated in expansion and shrinkage is dispersed by the projection section 1B, and thus cracks are hardly generated in the anode active material layer 2. Further, if the projection section 1B and the base material 1A are covered with the plating film made of a metal other than copper, the projection section 1B is hardly exfoliated from the base material 1A. Accordingly, in the anode 10, the contact characteristics between the anode current collector 1 and the anode active material layer 2 and the current collectivity are able to be more improved.

Therefore, if the anode 10 is used for an electrochemical device such as a secondary battery, the anode 10 is able to contribute to securing superior cycle characteristics and high safety.

Next, a description will be given of usage examples of the foregoing anode. In the description, a secondary battery will be taken as an example of electrochemical devices. The anode is used as follows.

First Secondary Battery

Figure 2:
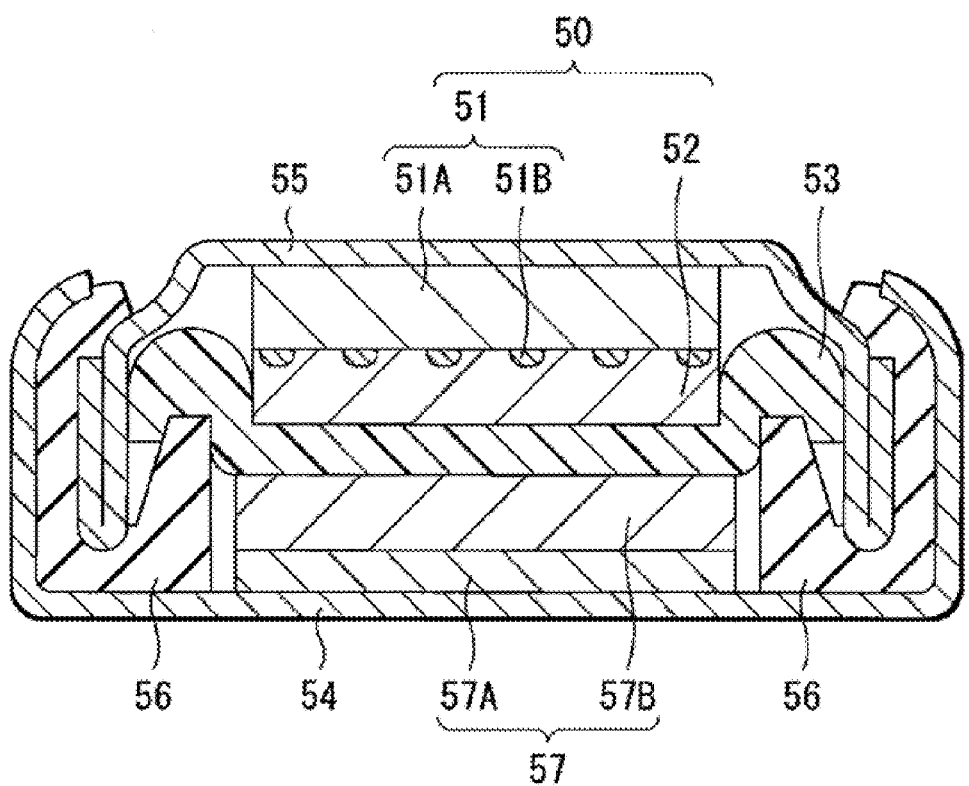
FIG. 2 is a cross sectional view illustrating a structure of a first secondary battery including the anode according to the embodiment.

FIG. 2 illustrates a cross sectional structure of a first secondary battery. The first secondary battery is a so-called coin type secondary battery in which an anode 50 contained in a package cup 55 and a cathode 57 contained in a package can 54 are layered with a separator 53 impregnated with an electrolytic solution in between. Peripheral edges of the package cup 55 and the package can 54 are hermetically sealed by being caulked with an insulative gasket 56. The package cup 55 and the package can 54 are respectively made of a metal such as stainless or aluminum (Al).

The cathode 57 has a structure in which a cathode active material layer 57B is provided on a single face of a cathode current collector 57A. The cathode current collector 57A is made of, for example, aluminum, nickel, stainless or the like. The cathode active material layer 57B contains a cathode active material, and may contain other material such as a binder and an electrical conductor according to needs.

The cathode active material contains one or more cathode materials capable of inserting and extracting lithium as an electrode reactant. As the cathode material, for example, a lithium-containing compound is preferable, since thereby a high energy density is able to be obtained. Examples of lithium-containing compounds include a composite oxide containing lithium and a transition metal element and a phosphate compound containing lithium and a transition metal element. In particular, a compound containing one or more selected from the group consisting of cobalt, nickel, manganese, and iron as a transition metal element is preferable, since thereby a higher voltage is obtained. The chemical formula thereof is expressed by, for example, $Li_xM1O_2$ or $Li_yM2PO_4$. In the formula, M1 and M2 represent one or more transition metal elements. Values of x and y vary according to charge and discharge states of the secondary battery, and are generally in the range of $0.05 \leq x \leq 1.10$ and $0.05 \leq y \leq 1.10$.

Examples of composite oxides containing lithium and a transition metal element include a lithium-cobalt composite oxide ($Li_xCoO_2$), a lithium-nickel composite oxide ($Li_xNiO_2$), a lithium-nickel-cobalt composite oxide ($Li_xNi_{(1-z)}Co_zO_2(z<1)$), a lithium-nickel-cobalt-manganese composite oxide ($Li_xNi_{(1-v-w)}Co_vMn_wO_2(v+w<1)$), and lithium-manganese composite oxide having a spinel type structure ($LiMn_2O_4$). Specially, the composite oxide containing cobalt is preferable, since thereby a high capacity is obtained and superior cycle characteristics are obtained. Examples of phosphate compounds containing lithium and a transition metal element include lithium-iron phosphate compound ($LiFePO_4$) and a lithium-iron-manganese phosphate compound ($LiFe_{(1-u)}Mn_uPO_4(u<1)$).

In addition, examples of cathode materials include an oxide such as titanium oxide, vanadium oxide, and manganese dioxide; a disulfide such as titanium disulfide and molybdenum disulfide; a chalcogenide such as niobium selenide; sulfur; and a conductive polymer such as polyaniline or polythiophene.

The anode 50 has a structure similar to that of the foregoing anode. The anode 50 has, for example, a structure in which an anode active material layer 52 is provided on a face of an anode current collector 51 opposed to the cathode active material layer 57B. Structures of the anode current collector 51 and the anode active material layer 52 are respectively similar to the structures of the anode current collector 1 and the anode active material layer 2 in the foregoing anode 10. That is, in the anode current collector 51, a plurality of projection sections 51 are provided on the surface of the base material 51A. A plating film (not illustrated) made of a metal other than copper may be provided to cover the base material 51A and the projection section 51B. In the anode 50, the charge capacity of the anode material capable of inserting and extracting lithium is preferably larger than the charge capacity of the cathode 57, since thereby even in a full-charged state, a possibility that lithium is precipitated as dendrite onto the anode 50 becomes low.

The separator 53 separates the cathode 57 from the anode 50, prevents current short circuit due to contact of both electrodes, and passes lithium ions. The separator 53 is made of, for example, a porous film composed of a synthetic resin such as polytetrafluoroethylene, polypropylene or polyethylene, or a ceramics porous film. The separator 53 may have a structure in which two or more of the foregoing porous films are layered. Specially, the porous film composed of polyolefin is preferable, since such a film has a superior short circuit preventive effect and is able to improve safety of the secondary battery by shutdown effect. In particular, polyethylene is preferable, since polyethylene provides shutdown effect at from 100 deg C. to 160 deg C. both inclusive and has superior electrochemical stability. Further, polypropylene is also preferable. In addition, as long as chemical stability is secured, a resin formed by copolymerizing or blending with polyethylene or polypropylene may be used.

An electrolytic solution as a liquid electrolyte is impregnated in the separator 53. The electrolytic solution contains a solvent and an electrolyte salt dissolved in the solvent.

The solvent contains, for example, one or more nonaqueous solvents such as an organic solvent. Examples of nonaqueous solvents include ethylene carbonate, propylene carbonate, butylene carbonate, dimethyl carbonate, diethyl carbonate, ethyl methyl carbonate, methylpropyl carbonate, γ-butyrolactone, γ-valerolactone, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, methyl acetate, ethyl acetate, methyl propionate, ethyl propionate, methyl butyrate, methyl isobutyrate, trimethyl methyl acetate, trimethyl ethyl acetate, acetonitrile, glutaronitrile, adiponitrile, methoxyacetonitrile, 3-methoxypropionitrile, N,N-dimethylformamide, N-methylpyrrolidinone, N-methyloxazolidinone, N,N'-dimethylimidazolidinone, nitromethane, nitroethane, sulfolane, trimethyl phosphate, and dimethyl sulfoxide. Specially, one or more selected from the group consisting of ethylene carbonate, propylene carbonate, dimethyl carbonate, diethyl carbonate, and ethyl methyl carbonate are preferable. Thereby, superior capacity characteristics, superior cycle characteristics, and superior storage characteristics are obtained. In this case, in particular, a mixture of a high viscosity (high dielectric constant) solvent (for example, specific inductive $\in \geq 30$) such as ethylene carbonate or propylene carbonate, and a low viscosity solvent (for example, viscosity ≦1 mPa·s) such as dimethyl carbonate, ethyl methyl carbonate, or diethyl carbonate is more preferable. Thereby, the dissociation property of the electrolyte salt and the ion mobility are improved, and thus higher effects are obtained.

The solvent preferably contains a cyclic ester carbonate having an unsaturated carbon bond shown in Chemical formula 1 to Chemical formula 3. Thereby, high cycle characteristics are obtained. One thereof may be used singly, or a plurality thereof may be used by mixture.

Chemical formula 1

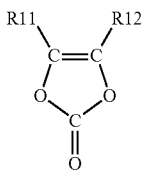

In the formula, R11 and R12 are a hydrogen group or an alkyl group.

Chemical formula 2

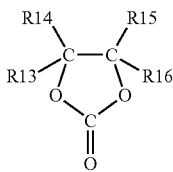

In the formula, R13 to R16 are a hydrogen group, an alkyl group, a vinyl group, or an aryl group. One or more of R13 to R16 are the vinyl group or the aryl group.

Chemical formula 3

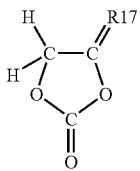

In the formula, R17 is an alkylene group.

The cyclic ester carbonate having an unsaturated carbon bond shown in Chemical formula 1 is a vinylene carbonate compound. Examples of vinylene carbonate compounds include vinylene carbonate (1,3-dioxole-2-one), methylvinylene carbonate (4-methyl-1,3-dioxole-2-one), ethylvinylene carbonate (4-ethyl-1,3-dioxole-2-one), 4,5-dimethyl-1,3-dioxole-2-one, 4,5-diethyl-1,3-dioxole-2-one, 4-fluoro-1,3-dioxole-2-one, and 4-trifluoromethyl-1,3-dioxole-2-one. Specially, vinylene carbonate is preferable, since vinylene carbonate is easily available and provides high effect.

The cyclic ester carbonate having an unsaturated carbon bond shown in Chemical formula 2 is a vinylethylene carbonate compound. Examples of vinylethylene carbonate compounds include vinylethylene carbonate (4-vinyl-1,3-dioxolane-2-one), 4-methyl-4-vinyl-1,3-dioxolane-2-one, 4-ethyl-4-vinyl-1,3-dioxolane-2-one, 4-n-propyl-4-vinyl-1,3-dioxolane-2-one, 5-methyl-4-vinyl-1,3-dioxolane-2-one, 4,4-divinyl-1,3-dioxolane-2-one, and 4,5-divinyl-1,3-dioxolane-2-one. Specially, vinylethylene carbonate is preferable, since vinylethylene carbonate is easily available, and provides high effect. It is needless to say that all of R13 to R16 may be the vinyl group or the aryl group. Otherwise, it is possible that some of R13 to R16 are the vinyl group, and the others thereof are the aryl group.

The cyclic ester carbonate having an unsaturated carbon bond shown in Chemical formula 3 is a methylene ethylene carbonate compound. Examples of methylene ethylene carbonate compounds include 4-methylene-1,3-dioxolane-2-one, 4,4-dimethyl-5-methylene-1,3-dioxolane-2-one, and 4,4-diethyl-5-methylene-1,3-dioxolane-2-one. The methylene ethylene carbonate compound may have one methylene group (compound shown in Chemical formula 3), or may have two methylene groups.

The cyclic ester carbonate having an unsaturated carbon bond may be catechol carbonate having a benzene ring or the like, in addition to the compounds shown in Chemical formula 1 to Chemical formula 3.

The content of the foregoing cyclic ester carbonate having an unsaturated bond in the solvent is preferably 0.01 wt % to 10 wt % both inclusive, since thereby sufficient effects are able to be obtained.

The solvent preferably contains one or more of a chain ester carbonate having halogen as an element shown in Chemical formula 4 and a cyclic ester carbonate having halogen as an element shown in Chemical formula 5. Thereby, a stable protective film is formed on the surface of the anode 50 and decomposition reaction of the electrolytic solution is inhibited, and thus the cycle characteristics are improved.

Chemical formula 4

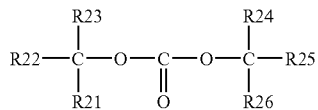

In the formula, R21 to R26 are a hydrogen group, a halogen group, an alkyl group, or an alkyl halide group. One or more of R21 to R26 are the halogen group or the alkyl halide group.

Chemical formula 5

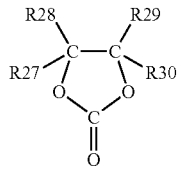

In the formula, R27 to R30 are a hydrogen group, a halogen group, an alkyl group, or an alkyl halide group. One or more of R27 to R30 are the halogen group or the alkyl halide group.

R21 to R26 in Chemical formula 4 may be identical or different. The same is applied to R27 to R30 in Chemical formula 5. Though the halogen type is not particularly limited, examples thereof include one or more selected from the group consisting of fluorine, chlorine, and bromine, and fluorine is specially preferable since thereby higher effect is obtained. It is needless to say that other halogen may be applicable.

The number of halogen is more preferably two than one, and further may be three or more, since thereby an ability to form a protective film is improved, and a more rigid and more stable protective film is formed. Accordingly, decomposition reaction of the electrolytic solution is more inhibited.

Examples of the chain ester carbonates having halogen shown in Chemical formula 4 include fluoromethyl methyl carbonate, bis(fluoromethyl) carbonate, and difluoromethyl methyl carbonate. One thereof may be used singly, or a plurality thereof may be used by mixture.

Examples of the cyclic ester carbonates having halogen shown in Chemical formula 5 include compounds shown in Chemical formulas 6(1) to 7(9). That is, examples thereof include 4-fluoro-1,3-dioxolane-2-one of Chemical formula 6(1), 4-chloro-1,3-dioxolane-2-one of Chemical formula 6(2), 4,5-difluoro-1,3-dioxolane-2-one of Chemical formula 6(3), tetrafluoro-1,3-dioxolane-2-one of Chemical formula 6(4), 4-fluoro-5-chloro-1,3-dioxolane-2-one of Chemical formula 6(5), 4,5-dichloro-1,3-dioxolane-2-one of Chemical formula 6(6), tetrachloro-1,3-dioxolane 2-one of Chemical formula 6(7), 4,5-bis trifluoromethyl-1,3-dioxolane 2-one of Chemical formula 6(8), 4-trifluoromethyl-1,3-dioxolane-2-one of Chemical formula 6(9), 4,5-difluoro-4,5-dimethyl-1,3-dioxolane-2-one of Chemical formula 6(10), 4-methyl-5,5-difluoro-1,3-dioxolane-2-one of Chemical formula 6(11), and 4-ethyl-5,5-difluoro-1,3-dioxolane-2-one of Chemical formula 6(12). Further, examples thereof include 4-trifluoromethyl-5-fluoro-1,3-dioxolane-2-one of Chemical formula 7(1), 4-trifluoromethyl-5-methyl-1,3-dioxolane-2-one of Chemical formula 7(2), 4-fluoro-4,5-dimethyl-1,3-dioxolane-2-one of Chemical formula 7(3), 4,4-difluoro-5-(1,1-difluoroethyl)-1,3-dioxolane-2-one of Chemical formula 7(4), 4,5-dichloro-4,5-dimethyl-1,3-dioxolane-2-one of Chemical formula 7(5), 4-ethyl-5-fluoro-1,3-dioxolane-2-one of Chemical formula 7(6), 4-ethyl-4,5-difluoro-1,3-dioxolane-2-one of Chemical formula 7(7), 4-ethyl-4,5,5-trifluoro-1,3-dioxolane-2-one of Chemical formula 7(8), and 4-fluoro-4-methyl-1,3-dioxolane-2-one of Chemical formula 7(9). One thereof may be used singly, or a plurality thereof may be used by mixture.

Chemical formula 6

(1)
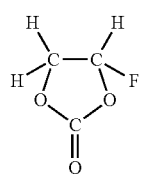

(2)
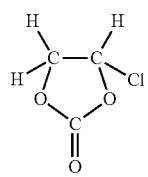

(3)
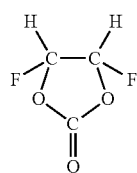

-continued (4)
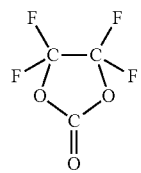

(5)
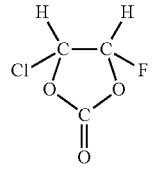

(6)
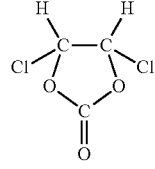

(7)
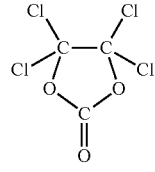

(8)
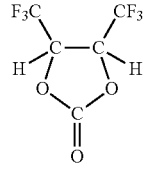

(9)
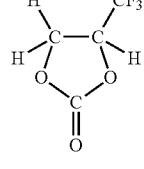

(10)
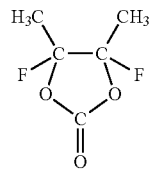

(11)
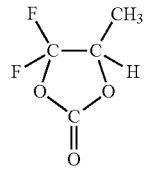

(12)
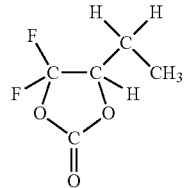

Chemical formula 7

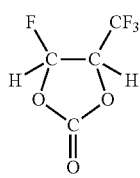 (1)

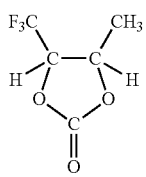 (2)

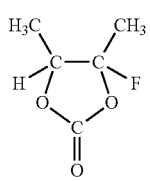 (3)

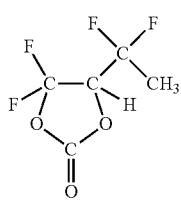 (4)

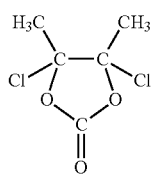 (5)

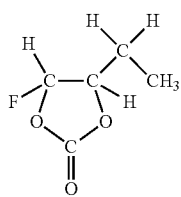 (6)

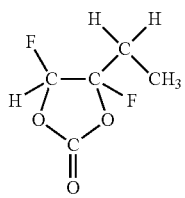 (7)

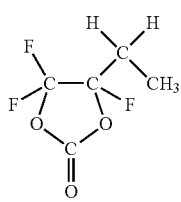 (8)

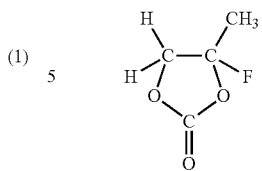 (9)

Specially, 4-fluoro-1,3-dioxolane-2-one or 4,5-difluoro-1,3-dioxolane-2-one is preferable, and 4,5-difluoro-1,3-dioxolane-2-one is more preferable. In particular, as 4,5-difluoro-1,3-dioxolane-2-one, a trans isomer is more preferable than a cis isomer, since the trans isomer is easily available and provides high effect.

Further, the solvent preferably contains sultone (cyclic sulfonic ester) or an acid anhydride, since thereby chemical stability of the electrolytic solution is more improved.

Examples of sultone include propane sultone and propene sultone. Specially, propane sultone is preferable. Such sultone may be used singly, or a plurality thereof may be used by mixture. The sultone content in the solvent is, for example, from 0.5 wt % to 5 wt % both inclusive.

Examples of acid anhydrides include carboxylic anhydride such as succinic anhydride, glutaric anhydride, or maleic anhydride; disulfonic anhydride such as ethane disulfonic anhydride or propane disulfonic anhydride; and an anhydride of carboxylic acid and sulfonic acid such as sulfobenzoic anhydride, sulfopropionic anhydride, or sulfobutyric anhydride. Specially, succinic anhydride or sulfobenzoic anhydride is preferable. The anhydrides may be used singly, or a plurality thereof may be used by mixture. The content of the acid anhydride in the solvent is, for example, from 0.5 wt % to 5 wt % both inclusive.

The electrolyte salt contains, for example, one or more light metal salts such as a lithium salt. The electrolyte salts described below may be combined voluntarily.

Examples of lithium salts include lithium hexafluorophosphate, lithium tetrafluoroborate, lithium perchlorate, lithium hexafluoroarsenate, lithium tetraphenylborate ($LiB(C_6H_5)_4$), lithium methanesulfonate ($LiCH_3SO_3$), lithium trifluoromethane sulfonate ($LiCF_3SO_3$), lithium tetrachloroaluminate ($LiAlCl_4$), dilithium hexafluorosilicate ($Li_2SiF_6$), lithium chloride (LiCl), and lithium bromide (LiBr).

Specially, one or more selected from the group consisting of lithium hexafluorophosphate, lithium tetrafluoroborate, lithium perchlorate, and lithium hexafluoroarsenate are preferable, and lithium hexafluorophosphate is more preferable, since the internal resistance is lowered, and thus higher effect is obtained.

The electrolyte salt preferably contains one or more selected from the group consisting of the compounds shown in Chemical formula 8 to Chemical formula 10. Thereby, in the case where such the compound is used together with the foregoing lithium hexafluorophosphate or the like, higher effect is obtained. R33 in Chemical formula 8 may be identical or different. The same is applied to R41 to R43 in Chemical formula 9 and R51 and R52 in Chemical formula 10.

Chemical formula 8

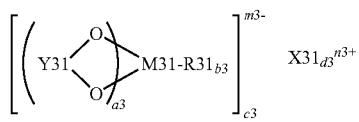

In the formula, X31 is a Group 1 element or a Group 2 element in the long period periodic table or aluminum. M31 is a transition metal element, a Group 13 element, a Group 14 element, or a Group 15 element in the long period periodic table. R31 is a halogen group. Y31 is —OC—R32-CO—, —OC—C(R33)$_2$-, or —OC—CO—. R32 is an alkylene group, an alkylene halide group, an arylene group, or an arylene halide group. R33 is an alkyl group, an alkyl halide group, an aryl group, or an aryl halide group. a3 is one of integer numbers 1 to 4. b3 is 0, 2, or 4. c3, d3, m3, and n3 are one of integer numbers 1 to 3.

Chemical formula 9

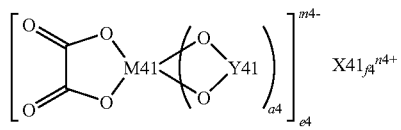

In the formula, X41 is a Group 1 element or a Group 2 element in the long period periodic table. M41 is a transition metal element, a Group 13 element, a Group 14 element, or a Group 15 element in the long period periodic table. Y41 is —OC—(C(R41)$_2$)$_{b4}$-CO—, —(R43)$_2$C—(C(R42)$_2$)$_{c4}$-CO—, —(R43)$_2$C—(C(R42)$_2$)$_{c4}$—C(R43)$_2$-, —(R43)$_2$C—(C(R42)$_2$)$_{c4}$-SO$_2$—, —O$_2$S—(C(R42)$_2$)$_{d4}$-SO$_2$—, or —OC—(C(R42)$_2$)$_{d4}$-SO$_2$—. R41 and R43 are a hydrogen group, an alkyl group, a halogen group, or an alkyl halide group. One or both of R41 and R43 are the halogen group or the alkyl halide group. R42 is a hydrogen group, an alkyl group, a halogen group, or an alkyl halide group. a4, e4, and n4 are 1 or 2. b4 and d4 are one of integer numbers 1 to 4. c4 is one of integer numbers 0 to 4. f4 and m4 are one of integer numbers 1 to 3.

Chemical formula 10

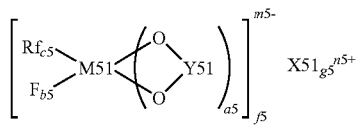

In the formula, X51 is a Group 1 element or a Group 2 element in the long period periodic table. M51 is a transition metal element, a Group 13 element, a Group 14 element, or a Group 15 element in the long period periodic table. Rf is a fluorinated alkyl group with the carbon number from 1 to 10 both inclusive or a fluorinated aryl group with the carbon number from 1 to 10 both inclusive. Y51 is —OC—(C(R51)$_2$)$_{d5}$-CO—, —(R52)$_2$C—(C(R51)$_2$)$_{d5}$-CO)—, —(R52)$_2$C—(C(R51)$_2$)$_{d5}$-C(R52)$_2$-, —(R52)$_2$C—(C(R51)$_2$)$_{d5}$-SO$_2$—, —O$_2$S—(C(R51)$_2$)$_{e5}$-SO$_2$—, or —OC—(C(R51)$_2$)$_{e5}$-SO$_2$—. R51 is a hydrogen group, an alkyl group, a halogen group, or an alkyl halide group. R52 is a hydrogen group, an alkyl group, a halogen group, or an alkyl halide group, and one or more thereof are the halogen group or the alkyl halide group. a5, f5, and n5 are 1 or 2. b5, c5, and e5 are one of integer numbers 1 to 4. d5 is one of integer numbers 0 to 4. g5 and m5 are one of integer numbers 1 to 3.

Group 1 element in the long period periodic table represents hydrogen, lithium, sodium, potassium, rubidium, cesium, and francium. Group 2 element represents beryllium, magnesium, calcium, strontium, barium, and radium. Group 13 element represents boron, aluminum, gallium, indium, and thallium. Group 14 element represents carbon, silicon, germanium, tin, and lead. Group 15 element represents nitrogen, phosphorus, arsenic, antimony, and bismuth.

Examples of the compounds shown in Chemical formula 8 include the compounds shown in Chemical formulas 11(1) to 11(6). Examples of the compounds shown in Chemical formula 9 include the compounds shown in Chemical formulas 12(1) to 12(8). Examples of the compounds shown in Chemical formula 10 include the compound shown in Chemical formula 13. It is needless to say that the compound is not limited to the compounds shown in Chemical formula 11(1) to Chemical formula 13 as long as the compound has a structure shown in Chemical formula 8 to Chemical formula 10.

Chemical formula 11

(1)

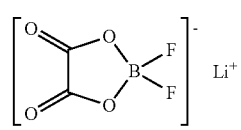

(2)

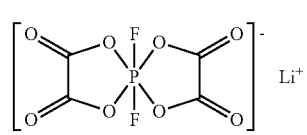

(3)

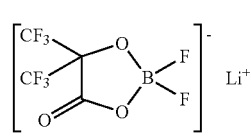

(4)

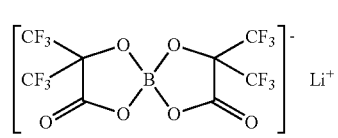

(5)

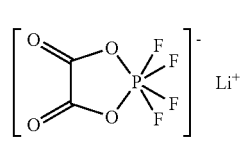

(6)

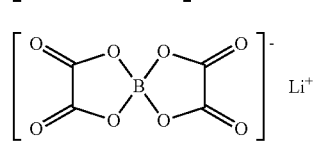

Chemical formula 12

(1)

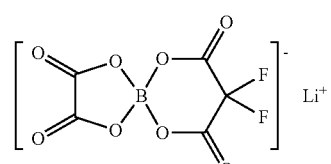

-continued (2) 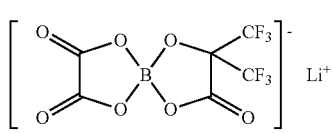

(3) 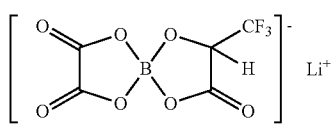

(4) 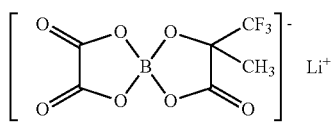

(5) 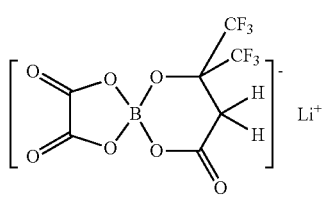

(6) 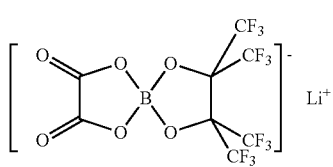

(7) 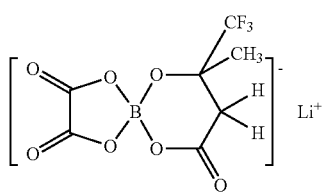

(8) 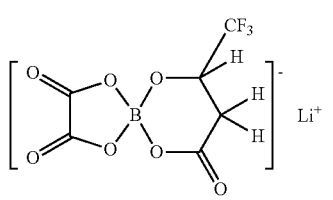

Chemical formula 13

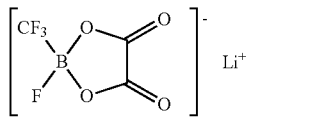

Further, the electrolyte salt may contain one or more selected from the group consisting of the compounds shown in Chemical formula 14 to Chemical formula 16. Thereby, in the case where such a compound is used together with the foregoing lithium hexafluorophosphate or the like, higher effect is obtained. m and n in Chemical formula 14 may be identical or different. The same is applied to p, q, and r in Chemical formula 16.

$$LiN(C_mF_{2m+1}SO_2)(C_nF_{2n+1}SO_2)$$ Chemical formula 14

In the formula, m and n are an integer number of 1 or more.

Chemical formula 15

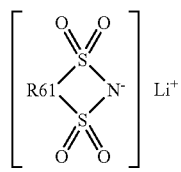

In the formula, R61 is a straight chain/branched perfluoro alkylene group with the carbon number from 2 to 4 both inclusive.

$$LiC(C_pF_{2p+1}SO_2)(C_qF_{2q+1}SO_2)(C_rF_{2r+1}SO_2)$$ Chemical formula 16

In the formula, p, q, and r are an integer number of 1 or more.

Examples of the chain compounds shown in Chemical formula 14 include lithium bis(trifluoromethanesulfonyl) imide ($LiN(CF_3SO_2)_2$), lithium bis(pentafluoroethanesulfonyl)imide ($LiN(C_2F_5SO_2)_2$), lithium (trifluoromethanesulfonyl)(pentafluoroethanesulfonyl)imide ($LiN(CF_3SO_2)(C_2F_5SO_2)$), lithium(trifluoromethanesulfonyl)(heptafluoropropanesulfonyl)imide ($LiN(CF_3SO_2)(C_3F_7SO_2)$), and lithium(trifluoromethanesulfonyl)(nonafluorobutanesulfonyl)imide ($LiN(CF_3SO_2)(C_4F_9SO_2)$). One thereof may be used singly, or a plurality thereof may be used by mixture.

Examples of the cyclic compounds shown in Chemical formula 15 include the compounds shown in Chemical formulas 17(1) to 17(4). That is, examples thereof include 1,2-perfluoroethanedisulfonyl imide lithium shown in Chemical formula 17(1), 1,3-perfluoropropanedisulfonyl imide lithium shown in Chemical formula 17(2), 1,3-perfluorobutanedisulfonyl imide lithium shown in Chemical formula 17(3), and 1,4-perfluorobutanedisulfonyl imide lithium shown in Chemical formula 17(4). One thereof may be used singly, or a plurality thereof may be used by mixture. Specially, 1,3-perfluoropropanedisulfonyl imide lithium is preferable, since thereby high effect is obtained.

Chemical formula 17

(1) 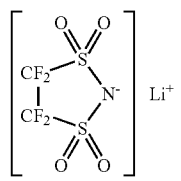

(2) 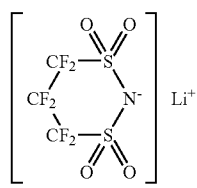

(3) 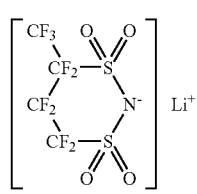

-continued

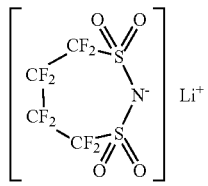

(4)

Examples of the chain compounds shown in Chemical formula 16 include lithium tris(trifluoromethanesulfonyl)methyde ($LiC(CF_3SO_2)_3$).

The content of the electrolyte salt to the solvent is preferably from 0.3 mol/kg to 3.0 mol/kg both inclusive. If out of the foregoing range, there is a possibility that the ion conductivity is significantly lowered.

The first secondary battery is manufactured, for example, by the following procedure.

First, the cathode 57 is formed. First, a cathode active material, a binder, and an electrical conductor are mixed to form a cathode mixture, which is dispersed in an organic solvent to form a paste cathode mixture slurry. Subsequently, a face of the cathode current collector 57A is uniformly coated with the cathode mixture slurry by using a doctor blade, a bar coater or the like, which is dried. Further, the coat is compression-molded by using a rolling press machine or the like while being heated if necessary to form the cathode active material layer 57B. In this case, compression molding may be repeated over several times. Finally, the cathode current collector 57A on which the cathode active material layer 57B is formed is punched out into a pellet with a given diameter to obtain the cathode 57.

Further, the anode 50 is formed by a procedure similar to the foregoing procedure of forming the anode 10. Specifically, first, the projection section 51B is formed on the surface of the base material 51A, which is plated with a plating film according to needs, and thereby the anode current collector 51 is formed. After that, the anode active material layer 52 is formed on the face of the anode current collector 51 on which the projection section 51B is provided. The resultant is punched out into a pellet with a given diameter.

Subsequently, the cathode 57, the anode 50, and the separator 53 are layered so that the cathode active material layer 57B and the anode active material layer 52 are opposed to each other with the separator 53 in between. After that, the resultant is contained in the package can 54. After that, an electrolytic solution is therein injected, and the resultant is caulked by laying the package cup 55 on the package can 54 with the gasket 56 in between. Accordingly, the first secondary battery in the shape of a coin is completed.

In the first secondary battery, lithium ions are inserted and extracted between the cathode 57 and the anode 50. That is, in the case of being charged, for example, lithium ions are extracted from the cathode 57 and inserted in the anode 50 through the electrolytic solution impregnated with the separator 53. Meanwhile, when discharged, for example, lithium ions are extracted from the anode 50 and inserted in the cathode 57 through the electrolytic solution impregnated with the separator 53.

According to the coin type secondary battery, since the anode 50 has a structure similar to that of the foregoing anode 10, contact characteristics between the anode current collector 51 and the anode active material layer 52 and current collectivity are able to be improved, and superior cycle characteristics are able to be realized.

In particular, in the case where the solvent of the electrolytic solution contains one or more of the chain ester carbonate having halogen shown in Chemical formula 1 and the cyclic ester carbonate having halogen shown in Chemical formula 2; one or more of the cyclic ester carbonates having an unsaturated bond shown in Chemical formula 5 to Chemical formula 7; sultone; or an acid anhydride, higher effect is able to be obtained.

Further, in the case where the electrolyte salt of the electrolytic solution contains one or more selected from the group consisting of lithium hexafluorophosphate, lithium tetrafluoroborate, lithium perchlorate, and lithium hexafluoroarsenate; one or more selected from the group consisting of the compounds shown in Chemical formula 8 to Chemical formula 10; or one or more selected from the group consisting of the compounds shown in Chemical formula 14 to Chemical formula 16, higher effect is able to be obtained.

Effects other than the foregoing effects of the secondary battery are similar to those of the foregoing anode 10.

Second Secondary Battery

Figure 3:
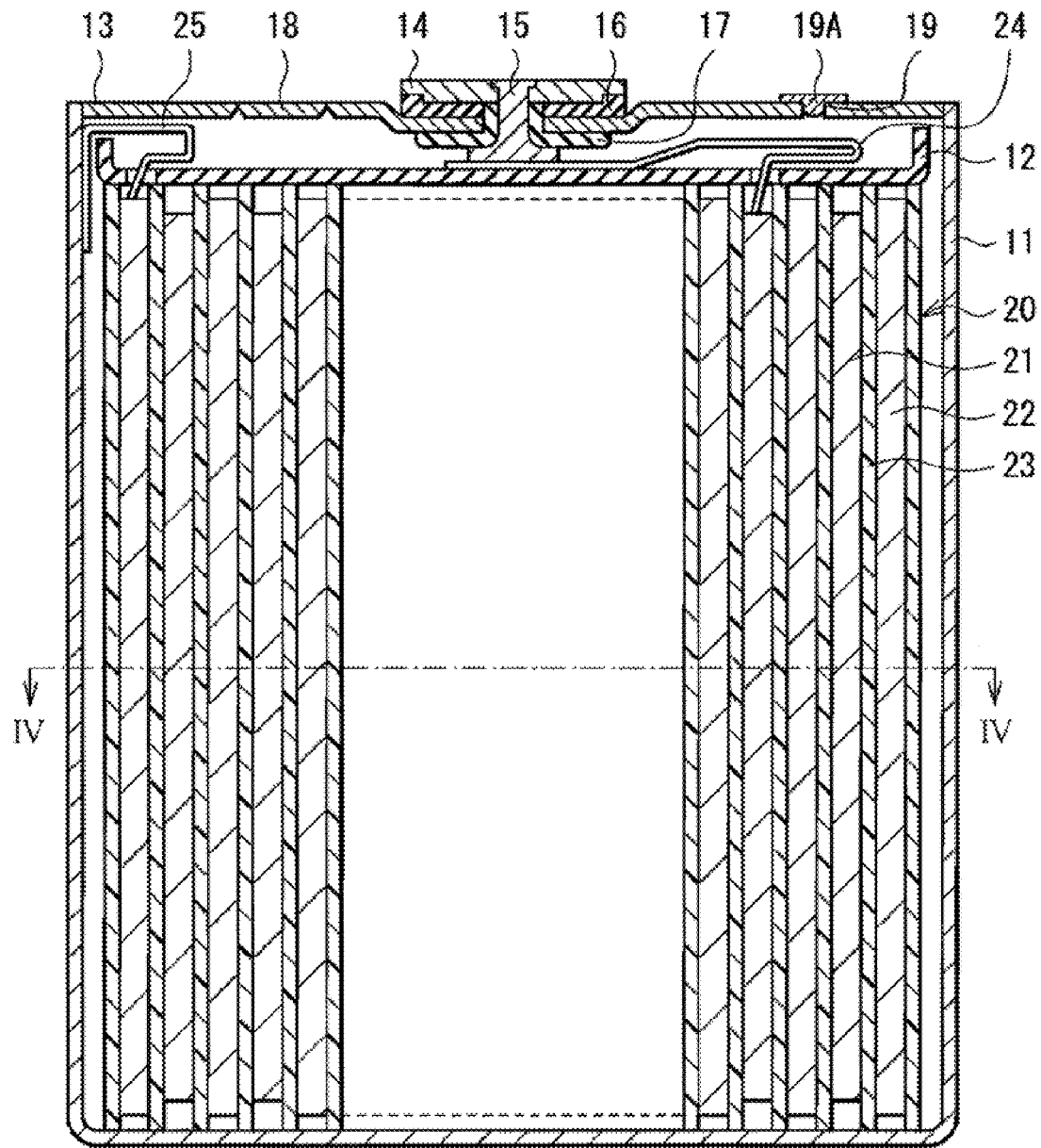
FIG. 3 is a cross sectional view illustrating a structure of a second secondary battery including the anode according to the embodiment.
Figure 4:
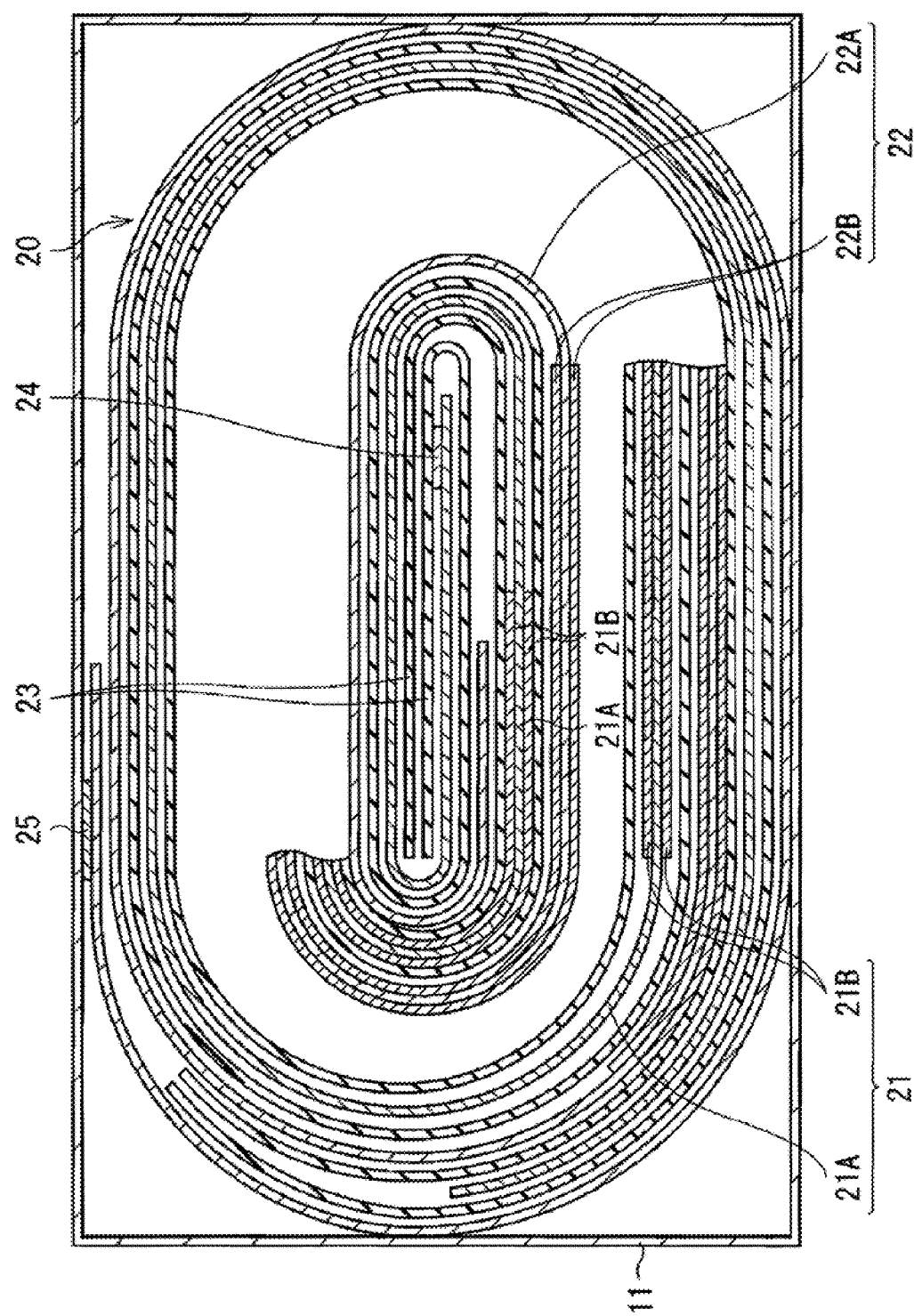
FIG. 4 is a cross sectional view illustrating a structure taken along line IV-IV of the spirally wound electrode body illustrated in FIG. 3.

FIG. 3 and FIG. 4 illustrate a cross sectional structure of a second secondary battery. FIG. 4 illustrates a cross section taken along line IV-IV illustrated in FIG. 3. The secondary battery herein described is, for example, a lithium ion secondary battery as the foregoing first secondary battery is.

The second secondary battery mainly contains a spirally wound electrode body 20 having a planular spirally wound structure in a battery can 11.

The battery can 11 is, for example, a square package member. As illustrated in FIG. 4, the square package member has a shape with the cross section in the longitudinal direction of a rectangle or an approximate rectangle (including curved lines in part). The battery can 11 structures not only a square battery in the shape of a rectangle, but also a square battery in the shape of an oval. That is, the square package member is a rectangle vessel-like member with the bottom or an oval vessel-like member with the bottom, which respectively has an opening in the shape of a rectangle or in the shape of an approximate rectangle (oval shape) formed by connecting circular arcs by straight lines. FIG. 4 illustrates a case that the battery can 11 has a rectangular cross sectional shape. The battery structure including the battery can 11 is a so-called square type.

The battery can 11 is made of, for example, a metal material containing iron, aluminum, or an alloy thereof. In some cases, the battery can 11 has a function as an anode terminal as well. In this case, to inhibit the secondary battery from being swollen by using the rigidity (hardly deformable characteristics) of the battery can 11 in charge and discharge, the battery can 11 is preferably made of rigid iron than aluminum. In the case where the battery can 11 is made of iron, for example, iron may be plated by nickel or the like.

The battery can 11 also has a hollow structure in which one end of the battery can 11 is closed and the other end of the battery can 11 is opened. At the open end of the battery can 11, an insulating plate 12 and a battery cover 13 are attached, and thereby inside of the battery can 11 is hermetically closed. The insulating plate 12 is located between the spirally wound electrode body 20 and the battery cover 13, is arranged perpendicularly to the spirally wound circumferential face of the spirally wound electrode body 20, and is made of, for example, polypropylene or the like. The battery cover 13 is, for example, made of a material similar to that of the battery can 11, and may also have a function as an electrode terminal as the battery can 11 does.

Outside of the battery cover 13, a terminal plate 14 as a cathode terminal is provided. The terminal plate 14 is electrically insulated from the battery cover 13 with an insulating case 16 in between. The insulating case 16 is composed of, for example, polybutylene terephthalate or the like. In the approximate center of the battery cover 13, a through-hole is provided. A cathode pin 15 is inserted in the through-hole so that the cathode pin is electrically connected to the terminal plate 14 and is electrically insulated from the battery cover 13 with a gasket 17 in between. The gasket 17 is made of, for example, an insulating material, and the surface thereof is coated with asphalt.

In the vicinity of the rim of the battery cover 13, a cleavage valve 18 and an injection hole 19 are provided. The cleavage valve 18 is electrically connected to the battery cover 13. In the case where the internal pressure of the battery becomes a certain level or more by internal short circuit, external heating or the like, the cleavage valve 18 is separated from the battery cover 13 to release the internal pressure. The injection hole 19 is sealed by a sealing member 19A made of, for example, a stainless corundum.

The spirally wound electrode body 20 is formed by layering a cathode 21 and the anode 22 with a separator 23 in between and then spirally winding the resultant laminated body. The spirally wound electrode body 20 is planular according to the shape of the battery can 11. A cathode lead 24 made of a metal material such as aluminum is attached to an end of the cathode 21 (for example, the internal end thereof). An anode lead 25 made of a metal material such as nickel is attached to an end of the anode 22 (for example, the outer end thereof). The cathode lead 24 is electrically connected to the terminal plate 14 by being welded to an end of the cathode pin 15. The anode lead 25 is welded and electrically connected to the battery can 11.

In the cathode 21, for example, a cathode active material layer 21B is provided on both faces of a cathode current collector 21A. However, the cathode active material layer 21B may be provided only on a single face of the cathode current collector 21A. Structures of the cathode current collector 21A and the cathode active material layer 21B are respectively similar to those of the cathode current collector 57A and the cathode active material layer 57B in the foregoing first secondary battery.

The anode 22 has a structure similar to that of the foregoing anode 10, in which, for example, an anode active material layer 22B is respectively provided on both faces of an anode current collector 22A. Structures of the anode current collector 22A and the anode active material layer 22B are respectively similar to those of the anode current collector 1 and the anode active material layer 2 in the foregoing anode 10. In FIG. 3 and FIG. 4, illustration of a projection section and a plating film in the anode 22 is omitted. In the anode 22, it is preferable that the capacity chargeable in the anode material capable of inserting and extracting lithium is larger than the discharge capacity of the cathode 21.

Further, the separator 23 and an electrolytic solution impregnated in the separator 23 are respectively similar to the separator 53 and the electrolytic solution impregnated in the separator 53 of the first secondary battery.

The second secondary battery is manufactured, for example, by the following procedure.

First, the cathode 21 is formed. First, a cathode active material, a cathode binder, and a cathode electrical conductor are mixed to prepare a cathode mixture, which is dispersed in an organic solvent to form a paste cathode mixture slurry. Subsequently, both faces of the cathode current collector 21A are uniformly coated with the cathode mixture slurry by using a doctor blade, a bar coater or the like, which is dried. Further, the coating is compression-molded by using a rolling press machine or the like while being heated if necessary to form the cathode active material layer 21B. In this case, compression molding may be repeated over several times.

Next, in the same manner as the procedure of forming the foregoing anode 10, the anode current collector 22A is formed by forming the projection section on both faces of the base material and covering the surface with the plating film, the anode active material layer 22B is formed on both faces of the anode current collector 22A, and thereby the anode 22 is formed.

Next, the spirally wound electrode body 20 is formed by using the cathode 21 and the anode 22. First, the cathode lead 24 is attached to the cathode current collector 21A by welding or the like, and the anode lead 25 is attached to the anode current collector 22A by welding or the like. Subsequently, the cathode 21 and the anode 22 are layered with the separator 23 in between. While the laminated body is spirally wound in the longitudinal direction, the resultant spirally wound body is formed into a planular shape. Accordingly, the spirally wound electrode body 20 is formed.

The secondary battery is assembled as follows. First, after the spirally wound electrode body 20 is contained in the battery can 11, the insulating plate 12 is arranged on the spirally wound electrode body 20. Subsequently, the cathode lead 24 is connected to the cathode pin 15 by welding or the like, and the anode lead 25 is connected to the battery can 11 by welding or the like. After that, the battery cover 13 is fixed on the open end of the battery can 11 by laser welding or the like. Finally, the electrolytic solution is injected into the battery can 11 from the injection hole 19, and impregnated in the separator 23. After that, the injection hole 19 is sealed by the sealing member 19A. The secondary battery shown in FIG. 3 and FIG. 4 is thereby completed.

In the secondary battery, when charged, for example, lithium ions are extracted from the cathode 21, and are inserted in the anode 22 through the electrolytic solution impregnated in the separator 23. Meanwhile, when discharged, for example, lithium ions are extracted from the anode 22, and are inserted in the cathode 21 through the electrolytic solution impregnated in the separator 23.

According to the square secondary battery, since the anode 22 has the structure similar to that of the foregoing anode 10, the cycle characteristics are able to be improved.

Further, in the case where the battery can 11 is made of a rigid metal, compared to a case that the battery can 11 is made of a soft film, the anode 22 is hardly broken in the case where the anode active material layer 22B is swollen or shrunk. Accordingly, the cycle characteristics are able to be more improved. In this case, in the case where the battery can 11 is made of iron that is more rigid than aluminum, higher effect is able to be obtained. Effects other than the foregoing effects of the secondary battery are similar to those of the first secondary battery.

Third Secondary Battery

Figure 5:
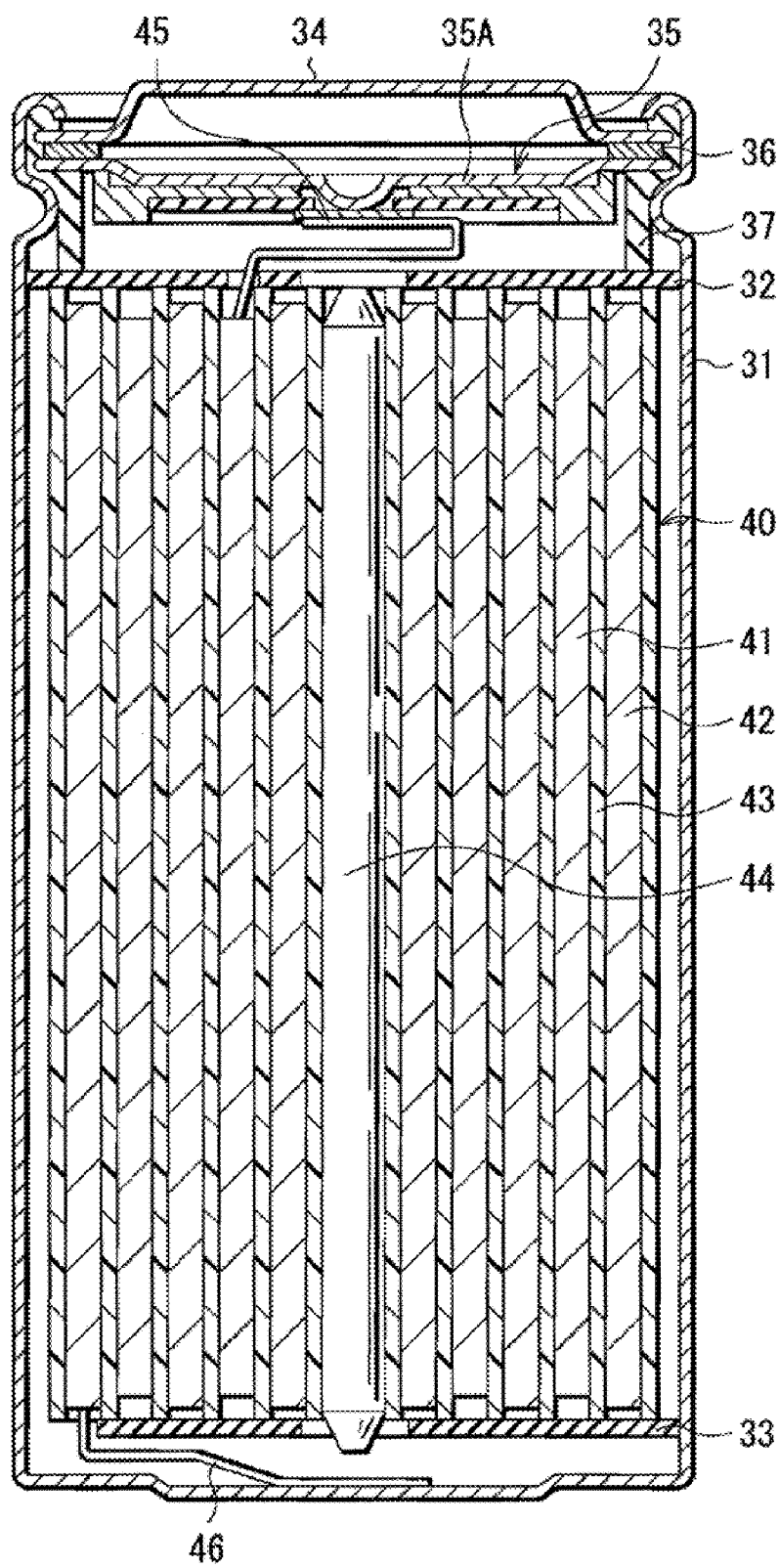
FIG. 5 is a cross sectional view illustrating a structure of a third secondary battery including the anode according to the embodiment.
Figure 6:
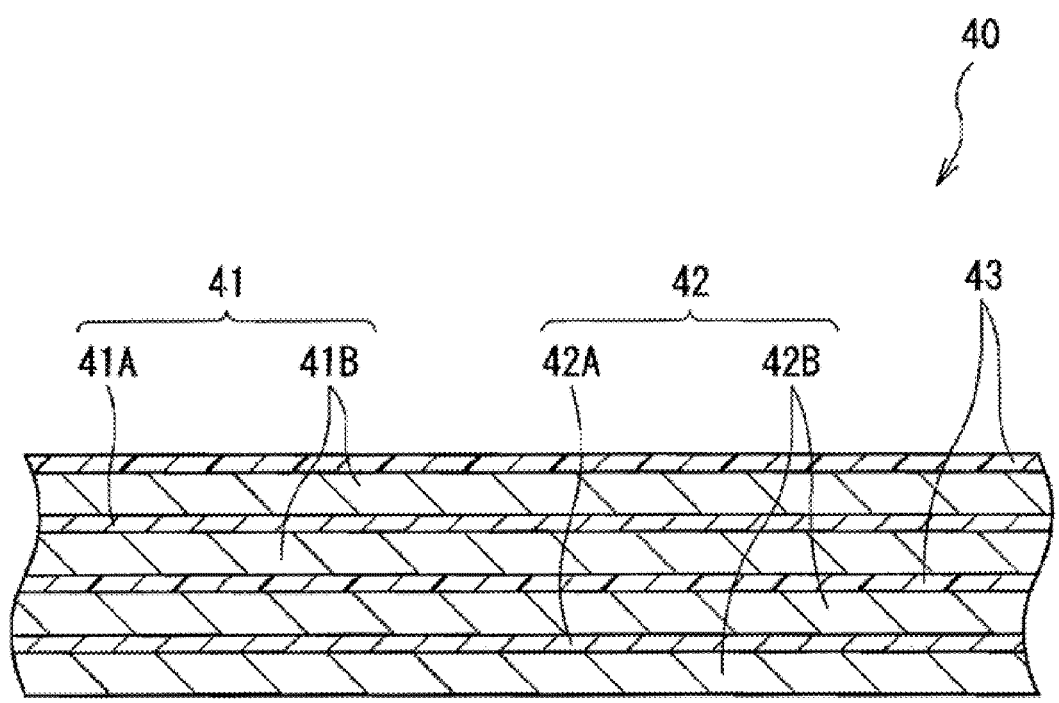
FIG. 6 is a cross sectional view illustrating an enlarged part of the spirally wound electrode body illustrated in FIG. 5.

FIG. 5 and FIG. 6 illustrate a cross sectional structure of a third secondary battery. FIG. 6 illustrates an enlarged part of a spirally wound electrode body 40 illustrated in FIG. 5. The third second secondary battery is, for example, a lithium ion secondary battery as the foregoing first secondary battery and the foregoing second secondary battery are. The third secondary battery contains the spirally wound electrode body 40 in which a cathode 41 and an anode 42 are layered with a separator 43 impregnated with a given electrolytic solution in between and spirally wound, and a pair of insulating plates 32 and 33 inside a battery can 31 in the shape of an approximately hollow cylinder. The battery structure including the battery can 31 is a so-called cylindrical type.

The cathode 41 has a structure in which, for example, a cathode active material layer 41B is provided on both faces of a cathode current collector 41A. However, the cathode active material layer 41B may be provided only on a single face of the cathode current collector 41A. Structures of the cathode current collector 41A and the cathode active material layer 41B are respectively similar to the structures of the cathode current collector 57A and the cathode active material layer 57B in the foregoing first secondary battery.

The anode 42 has a structure similar to that of the foregoing anode 10, for example, a structure in which an anode active material layer 42B is provided on both faces of an anode current collector 42A. The structures of the anode current collector 42A and the anode active material layer 42B are respectively similar to the structures of the anode current collector 1 and the anode active material layer 2 in the foregoing anode 10. In FIG. 5 and FIG. 6, illustration of a projection section and a plating film in the anode 42 is omitted. In the anode 42, it is preferable that the capacity chargeable in the anode material capable of inserting and extracting lithium is larger than the discharge capacity of the cathode 41.

Further, the separator 43 and the electrolytic solution impregnated in the separator 43 are respectively similar to the separator 53 and the electrolytic solution impregnated in the separator 53 of the first secondary battery.

The battery can 31 is made of, for example, a metal material similar to that of the battery can 11 in the foregoing second secondary battery. One end of the battery can 31 is closed, and the other end of the battery can 31 is opened. The pair of insulating plates 32 and 33 is arranged to sandwich the spirally wound electrode body 40 in between and to extend perpendicularly to the spirally wound periphery face.

At the open end of the battery can 31, a battery cover 34, and a safety valve mechanism 35 and a PTC (Positive Temperature Coefficient) device 36 provided inside the battery cover 34 are attached by being caulked with a gasket 37. Inside of the battery can 31 is thereby hermetically sealed. The battery cover 34 is made of, for example, a metal material similar to that of the battery can 31. The safety valve mechanism 35 is electrically connected to the battery cover 34 through the PTC device 36. In the safety valve mechanism 35, in the case where the internal pressure becomes a certain level or more by internal short circuit, external heating or the like, a disk plate 35A inverts to cut the electric connection between the battery cover 34 and the spirally wound electrode body 40. As temperature rises, the PTC device 36 increases the resistance and thereby limits a current to prevent abnormal heat generation resulting from a large current. The gasket 37 is made of, for example, an insulating material. The surface of the gasket 37 is coated with asphalt.

A center pin 44 may be inserted in the center of the spirally wound electrode body 40. In the spirally wound electrode body 40, a cathode lead 45 made of a metal material such as aluminum is connected to the cathode 41, and an anode lead 46 made of a metal material such as nickel is connected to the anode 42. The cathode lead 45 is electrically connected to the battery cover 34 by being welded to the safety valve mechanism 35. The anode lead 46 is welded and thereby electrically connected to the battery can 31.

The third secondary battery is manufactured, for example, by the following procedure.

First, for example, the cathode 41 is formed by forming the cathode active material layer 41B on both faces of the cathode current collector 41A and the anode 42 is formed by forming the anode active material layer 42B on both faces of the anode current collector 42A with the use of procedures similar to the procedures of forming the cathode 21 and the anode 22 in the foregoing second secondary battery. Subsequently, the cathode lead 45 is attached to the cathode 41 by welding or the like, and the anode lead 46 is attached to the anode 42 by welding or the like. Subsequently, the cathode 41 and the anode 42 are layered with the separator 43 in between and spirally wound, and thereby the spirally wound electrode body 40 is formed. After that, the center pin 44 is inserted in the center of spirally wound electrode body. Subsequently, the spirally wound electrode body 40 is sandwiched between the pair of insulating plates 32 and 33, and contained in the battery can 31. The end of the cathode lead 45 is welded to the safety valve mechanism 35, and the end of the anode lead 46 is welded to the battery can 31. Subsequently, the electrolytic solution is injected into the battery can 31 and impregnated in the separator 43. Finally, at the open end of the battery can 31, the battery cover 34, the safety valve mechanism 35, and the PTC device 36 are fixed by being caulked with the gasket 37. The secondary battery illustrated in FIG. 5 and FIG. 6 is thereby completed.

In the secondary battery, when charged, for example, lithium ions are extracted from the cathode 41 and inserted in the anode 42 through the electrolytic solution. Meanwhile, when discharged, for example, lithium ions are extracted from the anode 42, and inserted in the cathode 41 through the electrolytic solution.

According to the cylindrical secondary battery, the anode 42 has the structure similar to that of the foregoing anode 10. Thus, the cycle characteristics are able to be improved. Effects of the secondary battery other than the foregoing effects are similar to those of the first secondary battery.

Fourth Secondary Battery

Figure 7:
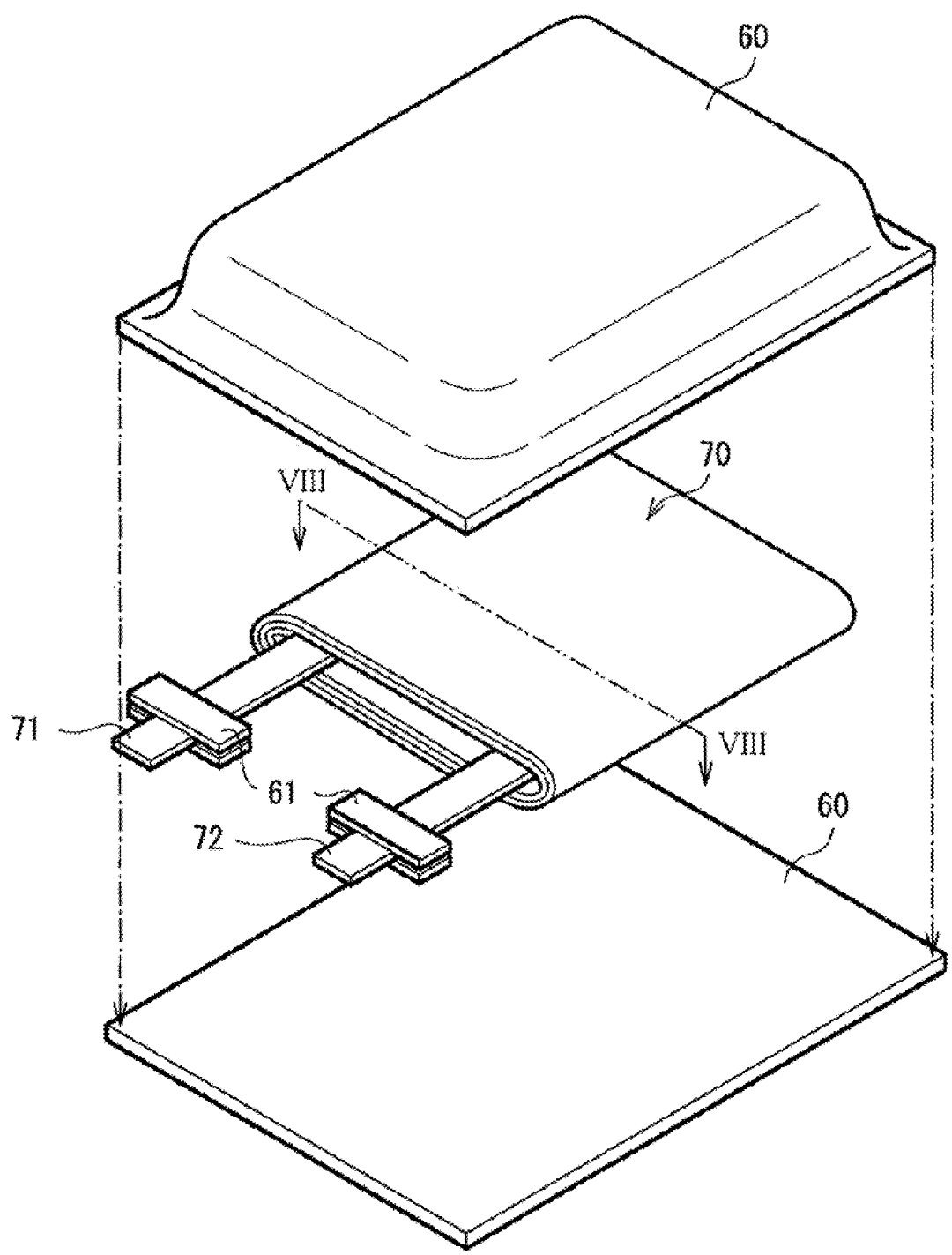
FIG. 7 is an exploded perspective view illustrating a structure of a fourth secondary battery including the anode according to the embodiment.
Figure 8:
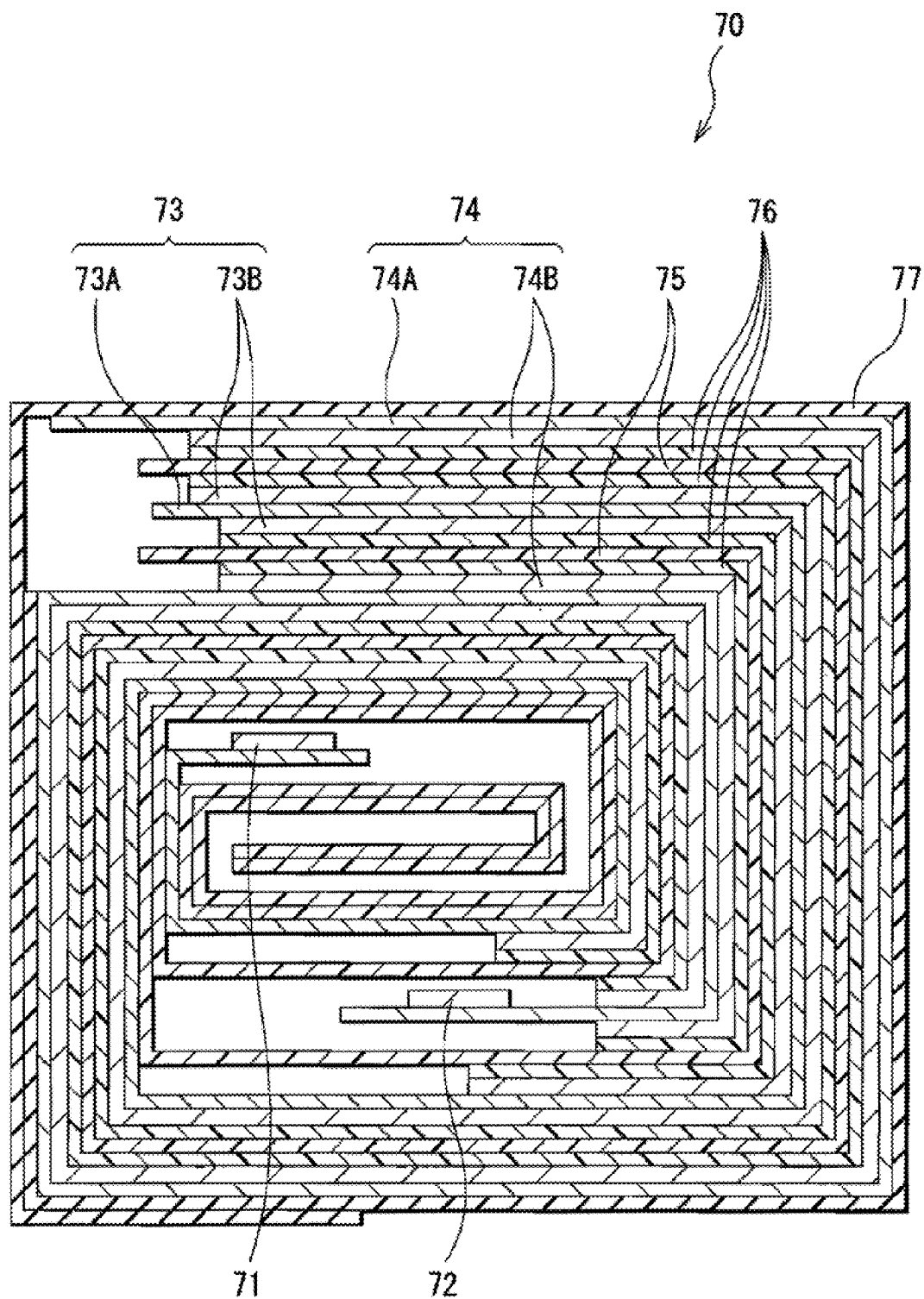
FIG. 8 is a cross sectional view illustrating a structure taken along line VIII-VIII of the spirally wound electrode body illustrated in FIG. 7.

FIG. 7 illustrates an exploded perspective structure of a fourth secondary battery. FIG. 8 illustrates an enlarged cross section taken along line VIII-VIII illustrated in FIG. 7. The fourth secondary battery is a lithium ion secondary battery as the foregoing first to the foregoing third secondary batteries are. In the fourth secondary battery, a spirally wound electrode body 70 on which a cathode lead 71 and an anode lead 72 are attached is contained in a film package member 60. The battery structure including the package member 60 is so-called laminated film type.

The cathode lead 71 and the anode lead 72 are respectively directed from inside to outside of the package member 60 in the same direction, for example. The cathode lead 71 is made of, for example, a metal material such as aluminum, and the anode lead 72 is made of, for example, a metal material such as copper, nickel, and stainless. These metal materials are in the shape of a thin plate or mesh.

The package member 60 is made of an aluminum laminated film in which, for example, a nylon film, an aluminum foil, and a polyethylene film are bonded together in this order. The package member 60 has, for example, a structure in which the respective outer edges of 2 pieces of rectangle aluminum laminated films are bonded with each other by fusion bonding or an adhesive so that the polyethylene film and the spirally wound electrode body 70 are opposed to each other.

An adhesive film 61 to protect from outside air intrusion is inserted between the package member 60 and the cathode lead 71/the anode lead 72. The adhesive film 61 is made of a material having contact characteristics to the cathode lead 71 and the anode lead 72. Examples of such a material include, for example, a polyolefin resin such as polyethylene, polypropylene, modified polyethylene, and modified polypropylene.

The package member 60 may be made of a laminated film having other laminated structure, a polymer film such as polypropylene, or a metal film, instead of the foregoing aluminum laminated film.\

In the spirally wound electrode body 70, a cathode 73 and an anode 74 are layered with a separator 75 and an electrolyte 76 in between and spirally wound. The outermost periphery thereof is protected by a protective tape 77.

The cathode 73 has a structure in which, for example, a cathode active material layer 73B is provided on both faces of a cathode current collector 73A. The anode 74 has a structure in which, for example, an anode active material layer 74B is provided on both faces of an anode current collector 74A. The structures of the cathode current collector 73A, the cathode active material layer 73B, the anode current collector 74A, the anode active material layer 74B, and the separator 73 are respectively similar to those of the cathode current collector 57A, the cathode active material layer 57B, the anode current collector 51, the anode active material layer 53, and the separator 53 of the foregoing first secondary battery. In FIG. 7 and FIG. 8, illustration of a projection section and a plating film in the anode 74 is omitted.

The electrolyte 76 is a so-called gel electrolyte, containing an electrolytic solution and a polymer compound that holds the electrolytic solution. The gel electrolyte is preferable, since high ion conductivity (for example, 1 mS/cm or more at room temperature) is obtained and liquid leakage is prevented.

Examples of polymer compounds include polyacrylonitrile, polyvinylidene fluoride, a copolymer of polyvinylidene fluoride and polyhexafluoro propylene, polytetrafluoroethylene, polyhexafluoropropylene, polyethylene oxide, polypropylene oxide, polyphosphazene, polysiloxane, polyvinyl acetate, polyvinyl alcohol, polymethacrylic acid methyl, polyacrylic acid, polymethacrylic acid, styrene-butadiene rubber, nitrile-butadiene rubber, polystyrene, and polycarbonate. One of these polymer compounds may be used singly, or two or more thereof may be used by mixture. Specially, polyacrylonitrile, polyvinylidene fluoride, polyhexafluoropropylene, or polyethylene oxide is preferably used, since such a compound is electrochemically stable.

The composition of the electrolytic solution is similar to the composition of the electrolytic solution in the first secondary battery. However, in the electrolyte 76 as the gel electrolyte, the solvent of the electrolytic solution means a wide concept including not only the liquid solvent but also a solvent having ion conductivity capable of dissociating the electrolyte salt. Therefore, in the case where the polymer compound having ion conductivity is used, the polymer compound is also included in the solvent.

Instead of the gel electrolyte 76 in which the electrolytic solution is held by the polymer compound, the electrolytic solution may be directly used. In this case, the electrolytic solution is impregnated in the separator 75.

The secondary battery including the gel electrolyte 76 is manufactured, for example, by the following three procedures.

In the first manufacturing method, first, for example, the cathode 73 is formed by forming the cathode active material layer 73B on both faces of the cathode current collector 73A, and the anode 74 is formed by forming the anode active material layer 74B on both faces of the anode current collector 74A by a procedure similar to the procedure of forming the cathode 21 and the anode 22 in the foregoing second secondary battery. Subsequently, a precursor solution containing an electrolytic solution, a polymer compound, and a solvent is prepared. After the cathode 73 and the anode 74 are coated with the precursor solution, the solvent is volatilized to form the gel electrolyte 76. Subsequently, the cathode lead 71 is attached to the cathode current collector 73A, and the anode lead 72 is attached to the anode current collector 74A. Subsequently, the cathode 73 and the anode 74 provided with the electrolyte 76 are layered with the separator 75 in between and spirally wound to obtain a laminated body. After that, the protective tape 77 is adhered to the outermost periphery thereof to form the spirally wound electrode body 70. Finally, for example, after the spirally wound electrode body 70 is sandwiched between 2 pieces of the film package members 60, outer edges of the package members 60 are contacted by thermal fusion bonding or the like to enclose the spirally wound electrode body 70. At this time, the adhesive films 61 are inserted between the cathode lead 71/the anode lead 72 and the package member 60. Thereby, the secondary battery illustrated in FIG. 7 and FIG. 8 is completed.

In the second manufacturing method, first, the cathode lead 71 is attached to the cathode 73, and the anode lead 72 is attached to the anode 74. Subsequently, the cathode 73 and the anode 74 are layered with the separator 75 in between and spirally wound. After that, the protective tape 77 is adhered to the outermost periphery thereof, and thereby a spirally wound body as a precursor of the spirally wound electrode body 70 is formed. Subsequently, after the spirally wound body is sandwiched between 2 pieces of the film package members 60, the outermost peripheries except for one side are bonded by thermal fusion bonding or the like to obtain a pouched state, and the spirally wound body is contained in the pouch-like package member 60. Subsequently, a composition of matter for electrolyte containing an electrolytic solution, a monomer as a raw material for the polymer compound, a polymerization initiator, and if necessary other material such as a polymerization inhibitor is prepared, which is injected into the pouch-like package member 60. After that, the opening of the package member 60 is hermetically sealed by thermal fusion bonding or the like. Finally, the monomer is thermally polymerized to obtain a polymer compound. Thereby, the gel electrolyte 76 is formed. Accordingly, the secondary battery illustrated in FIG. 7 and FIG. 8 is completed.

In the third manufacturing method, firstly, the spirally wound body is formed and contained in the pouch-like package member 60 in the same manner as that of the foregoing second manufacturing method, except that the separator 75 with both faces coated with a polymer compound is used. Examples of polymer compounds with which the separator 75 is coated include a polymer containing vinylidene fluoride as a component, that is, a homopolymer, a copolymer, and a multicomponent copolymer. Specific examples thereof include polyvinylidene fluoride, a binary copolymer containing vinylidene fluoride and hexafluoro propylene as a component, a ternary copolymer containing vinylidene fluoride, hexafluoro propylene, and chlorotrifluoroethylene as a component. As a polymer compound, in addition to the foregoing polymer containing vinylidene fluoride as a component, another one or more polymer compounds may be contained. Subsequently, an electrolytic solution is prepared and injected into the package member 60. After that, the opening of the package member 60 is sealed by thermal fusion bonding or the like. Finally, the resultant is heated while a weight is applied to the package member 60, and the separator 75 is contacted with the cathode 73 and the anode 74 with the polymer compound in between. Thereby, the electrolytic solution is impregnated into the polymer compound, and the polymer compound is gelated to form the electrolyte 76. Accordingly, the secondary battery illustrated in FIG. 7 and FIG. 8 is completed.

In the third manufacturing method, the swollenness of the secondary battery is inhibited compared to the first manufacturing method. Further, in the third manufacturing method, the monomer, the solvent and the like as a raw material of the polymer compound are hardly left in the electrolyte 76 compared to the second manufacturing method. In addition, the formation step of the polymer compound is favorably controlled. Thus, sufficient contact characteristics are obtained between the cathode 73/the anode 74/the separator 75 and the electrolyte 76.

According to the laminated film secondary battery, the anode 74 has the structure similar to that of the foregoing anode 10. Thus, the cycle characteristics are able to be improved. Effects of the secondary battery other than the foregoing effect are similar to those of the first secondary battery.

EXAMPLES

Examples of the invention will be described in detail

Example 1-1

The coin type secondary battery illustrated in FIG. 2 was fabricated by the following procedure. At this time, the secondary battery was fabricated as a lithium ion secondary battery in which the capacity of the anode 50 was expressed based on insertion and extraction of lithium.

First, the cathode 57 was formed. First, lithium carbonate ($Li_2CO_3$) and cobalt carbonate ($CoCO_3$) were mixed at a molar ratio of 0.5:1. After that, the mixture was fired in the air at 900 deg C. for 5 hours. Thereby, lithium cobalt composite oxide ($LiCoO_2$) having an average particle diameter of 5 μm was obtained. Subsequently, 96 parts by mass of the foregoing lithium cobalt composite oxide as a cathode active material, 1 part by mass of carbon black as a cathode electrical conductor, and 3 parts by mass of polyvinylidene fluoride as a cathode binder were mixed to obtain a cathode mixture. After that, the cathode mixture was dispersed in N-methyl-2-pyrrolidone to obtain a paste cathode mixture slurry. Further, a face of the cathode current collector 57A made of a strip-shaped aluminum foil (thickness: 15 μm) was uniformly coated with the cathode mixture slurry, which was dried. After that, the resultant was compression-molded by a roll pressing machine to form the cathode active material layer 57B. Finally, the cathode current collector 57A on which the cathode active material layer 57B was formed was punched out into a pellet having a diameter of 15.5 mm to obtain the cathode 57.

Next, the anode 50 was formed as follows. First, as the base material 51A, an electrolytic copper foil having a thickness of 20 μm that had not been provided with roughening treatment was formed. More specifically, a stainless steel plate as an anode and a copper plate as a cathode were let into a container containing a plating bath having a composition illustrated in Table 1. While the plating bath was retained at 30 deg C., a current was applied at a current density of 5 A/dm². Thereby, the electrolytic copper foil having a thickness of 20 μm was precipitated on the surface of the copper plate. As the plating bath, a plating bath containing copper sulfate pentahydrate ($CuSO_4.5H_2O$) of 300 g/dm³, sulfuric acid of 180 g/dm³, copper chloride of 5 mg/dm³, and polyethylene glycol and 3-3'-dithiobis (1-propanesulfonic acid) sodium as an additive was used.

TABLE 1

| | Plating bath in forming electrolytic copper foil | | | | |
|---|---|---|---|---|---|
| | $CuSO_4 \cdot 5H_2O$ (g/dm³) | $H_2SO_4$ (g/dm³) | CuCl (g/dm³) | Additive 1 (g/dm³) | Additive 2 (g/dm³) |
| Example 1-1 | 300 | 180 | 0.005 | 0.005 | 0.007 |
| Example 1-2 | 500 | 220 | 0.016 | 0.005 | 0.007 |
| Example 1-3 | 400 | 200 | 0.008 | 0.005 | 0.007 |
| Example 1-4 | 250 | 160 | 0.002 | 0.005 | 0.007 |
| Example 1-5 | 150 | 180 | 0.020 | 0.005 | 0.007 |
| Example 1-6 | 550 | 260 | 0.016 | 0.005 | 0.007 |
| Example 1-7 | 500 | 220 | 0.016 | 0.007 | 0.002 |
| Example 1-8 | 400 | 200 | 0.008 | 0.007 | 0.002 |
| Example 1-9 | 300 | 180 | 0.005 | 0.007 | 0.002 |
| Example 1-10 | 250 | 160 | 0.002 | 0.007 | 0.002 |
| Example 1-11 | 300 | 180 | 0.005 | 0.009 | 0.007 |
| Example 1-12 | 300 | 180 | 0.005 | 0.013 | 0.007 |
| Example 1-13 | 300 | 180 | 0.005 | 0.005 | 0.015 |
| Example 1-14 | 300 | 180 | 0.005 | 0.005 | 0.021 |
| Example 1-15 | 300 | 180 | 0.005 | 0.013 | 0.021 |
| Example 1-16 | 300 | 180 | 0.005 | 0.015 | 0.013 |
| Example 1-17 | 300 | 180 | 0.005 | 0.005 | 0.021 |

Additive 1: polyethylene glycol
Additive 2: 3-3'-dithiobis (1-propanesulfonic acid) sodium The projection section 51B composed of copper fine particles was formed on a face of the base material 51A (electrolytic copper foil) obtained as above by electrolytic precipitation method. More specifically, a plating bath containing copper sulfate pentahydrate ($CuSO_4.5H_2O$) of 50 g/dm³, sulfuric acid of 100 g/dm³, and gelatin of 1 g/dm³ was retained at 30 deg C., a current was applied at a current density of 30 A/dm² for 5 seconds. Thereby, fine copper particles having an average diameter of 2.0 μm were precipitated. Subsequently, plating treatment (covering plating) was performed to form a plating film that covers over the projection section 51B and the base material 51A continuously. A plating bath containing cobalt sulfate heptahydrate ($CoSO_4.7H_2O$) of 100 g/dm³ and boric acid of 10 g/dm³ was retained at 60 deg C., a current was applied at a current density of 10 A/dm² for 15 seconds, and thereby a plating film composed of cobalt was formed. In result, the anode current collector 51 having surface roughness Rz value of 2.5 μm was obtained. After that, the anode active material layer 52 having a thickness of 6 μm composed of silicon was formed on a face of the anode current collector 51 by electron beam evaporation method. Further, the resultant was punched out into a pellet having a diameter of 16 mm, and accordingly the anode 50 was obtained.

Subsequently, the cathode 57, the anode 50, and the separator 53 made of a microporous polypropylene film were layered so that the cathode active material layer 57B and the anode active material layer 52 were opposed to each other with the separator 53 in between. After that, the resultant was contained in the package can 54. For the separator 53, a 3-layer structure polymer film having a total thickness of 23 μm in which an outer layer composed of a microporous polyethylene as a main component was provided on both faces of the central layer composed of a microporous polyethylene as a main component was used. After that, an electrolytic solution was therein injected, and the resultant was caulked by laying the package cup 55 on the package can 54 with the gasket 56 in between. Accordingly, the coin type secondary battery was completed.

For the electrolytic solution, a solution obtained by mixing ethylene carbonate (EC), diethyl carbonate (DEC), and vinylene carbonate (VC) as a solvent, and dissolving therein lithium hexafluorophosphate ($LiPF_6$) as an electrolyte salt was used. At this time, the solvent composition (EC:DEC:VC) was 30:60:10 at a weight ratio. The content of $LiPF_6$ to the solvent was 1.0 mol/kg.

Examples 1-2 to 1-17

Coin type secondary batteries were fabricated in the same manner as that of Example 1-1, except that in forming the electrolytic copper foil as the base material 51A, each composition of the plating bath was changed as illustrated in Table 1.

Examples 1-18 to 1-27

Coin type secondary batteries were fabricated in the same manner as that of Example 1-1, except that in forming the electrolytic copper foil as the base material 51A, each composition of the plating bath was changed as illustrated in Table 2.

TABLE 2

| | Plating bath in forming electrolytic copper foil | | | | |
|---|---|---|---|---|---|
| | $CuSO_4 \cdot 5H_2O$ (g/dm³) | $H_2SO_4$ (g/dm³) | CuCl (g/dm³) | Additive 1 (g/dm³) | Additive 2 (g/dm³) |
| Example 1-1 | 300 | 180 | 0.005 | 0.005 | 0.007 |
| Example 1-18 | 400 | 200 | 0.008 | 0.005 | 0.002 |
| Example 1-19 | 400 | 200 | 0.008 | 0.007 | 0.002 |
| Example 1-20 | 400 | 200 | 0.008 | 0.007 | 0.002 |
| Example 1-21 | 400 | 200 | 0.008 | 0.007 | 0.002 |
| Example 1-22 | 400 | 200 | 0.008 | 0.007 | 0.002 |
| Example 1-23 | 250 | 160 | 0.002 | 0.005 | 0.002 |
| Example 1-24 | 250 | 160 | 0.002 | 0.007 | 0.002 |
| Example 1-25 | 250 | 160 | 0.002 | 0.007 | 0.002 |
| Example 1-26 | 250 | 160 | 0.002 | 0.007 | 0.002 |
| Example 1-27 | 250 | 160 | 0.002 | 0.007 | 0.002 |

Additive 1: polyethylene glycol
Additive 2: 3-3'-dithiobis (1-propanesulfonic acid) sodium The volume resistivity of the base material 51A (electrolytic copper foil) of the anode 50 in the secondary batteries of Examples 1-1 to 1-27 was measured by using a four probe type resistance measurement device, Dia Instruments Co. make. Further, by using a carbon sulfur simultaneous analysis device (LECO Co. make) and high frequency combustion-solid state infrared absorption method, quantitative analysis of carbon and sulfur contained in the base material 51A (electrolytic copper foil) was performed. More specifically, the electrolytic copper foil of 0.5 g was cut as a sample. The cut-out sample and a combustion improver were let into a crucible and combusted to generate $CO_2$ and $SO_2$ as carbon component and sulfur component, which were detected by infrared absorption method. An analytical curve was obtained based on a standard sample of stainless steel (SUS304) with the known component, and quantitative analysis was performed according thereto. Table 3 and Table 4 illustrate the measurement results of each volume resistivity, each carbon content ratio, and each sulfur content ratio in each base material 51A (electrolytic copper foil) of Examples 1-1 to 1-27. Procedures and conditions in examining each volume resistivity, each carbon content ratio, and each sulfur content ratio were similar to those in the after-mentioned examples.

Further, for the secondary batteries of Examples 1-1 to 1-27, the cycle characteristics were examined in the following procedure. The results illustrated in Table 3 and Table 4 were obtained.

TABLE 3

Anode active material: Si (electron beam evaporation method)
Tire profile of crystallite of anode current collector: 0.1 or less
Surface roughness of anode current collector: Rz = 2.5 μm

| | Crystallite average diameter (μm) | Carbon concentration (ppm) | Sulfur concentration (ppm) | Volume resistivity (μΩ * cm) | Tensile strength (N/mm2) | Prick test | Discharge capacity retention ratio (%) |
|---|---|---|---|---|---|---|---|
| Example 1-1 | 0.1 | 35 | 45 | 2.2 | 443 | ○ | 79 |
| Example 1-2 | 5 | 34 | 44 | 2.9 | 401 | ○ | 71 |
| Example 1-3 | 1 | 36 | 48 | 2.6 | 423 | ○ | 73 |
| Example 1-4 | 0.01 | 34 | 48 | 2.0 | 467 | ○ | 78 |
| Example 1-5 | <0.01 | — | — | — | — | — | — |
| Example 1-6 | 5.1 | 34 | 46 | 3.1 | 380 | Δ | 64 |
| Example 1-7 | 5 | 53 | 9 | 2.9 | 452 | ○ | 82 |
| Example 1-8 | 1 | 55 | 10 | 2.9 | 456 | ○ | 83 |
| Example 1-9 | 0.1 | 52 | 8 | 2.6 | 455 | ○ | 82 |
| Example 1-10 | 0.01 | 54 | 10 | 2.3 | 459 | ○ | 84 |
| Example 1-11 | 0.1 | 70 | 48 | 2.6 | 448 | ○ | 77 |
| Example 1-12 | 0.1 | 100 | 43 | 2.8 | 451 | ○ | 78 |
| Example 1-13 | 0.1 | 34 | 67 | 2.4 | 444 | ○ | 77 |
| Example 1-14 | 0.1 | 37 | 100 | 2.7 | 448 | ○ | 77 |
| Example 1-15 | 0.1 | 100 | 100 | 2.9 | 459 | ○ | 79 |
| Example 1-16 | 0.1 | 101 | 48 | 3.1 | 189 | Δ | 31 |
| Example 1-17 | 0.1 | 37 | 101 | 3.2 | 214 | Δ | 28 |

TABLE 4

Anode active material: Si (electron beam evaporation method)
Tire profile of crystallite of anode current collector: 0.1 or less
Surface roughness of anode current collector: Rz = 2.5 μm

| | Crystallite average diameter (μm) | Carbon concentration (ppm) | Sulfur concentration (ppm) | Volume resistivity (μΩ * cm) | Tensile strength (N/mm2) | Prick test | Discharge capacity retention ratio (%) |
|---|---|---|---|---|---|---|---|
| Example 1-18 | 1 | 34 | 9 | 2.5 | 456 | ○ | 82 |
| Example 1-19 | 1 | 52 | 10 | 2.6 | 458 | ○ | 86 |
| Example 1-20 | 1 | 67 | 7 | 2.7 | 457 | ○ | 82 |
| Example 1-21 | 1 | 52 | 2 | 2.4 | 456 | ○ | 84 |
| Example 1-22 | 1 | 52 | 20 | 2.5 | 455 | ○ | 80 |
| Example 1-23 | 0.01 | 33 | 7 | 2.8 | 453 | ○ | 85 |
| Example 1-24 | 0.01 | 55 | 10 | 2.9 | 459 | ○ | 87 |
| Example 1-25 | 0.01 | 71 | 9 | 3.0 | 457 | ○ | 86 |
| Example 1-26 | 0.01 | 51 | 3 | 2.7 | 456 | ○ | 86 |
| Example 1-27 | 0.01 | 53 | 21 | 2.9 | 455 | ○ | 84 |

Specifically, charge and discharge were performed in the atmosphere at 23 deg C. as follows. First, for charge, constant current charge was performed at the constant current of 0.2 C until the battery voltage reached 4.2 V, and subsequently constant voltage charge was performed at the constant voltage of 4.2 V until the current value reached 0.05 C. Next, for discharge, constant current discharge was performed at the constant current of 0.2 C until the battery voltage reached 2.5 V. The combination of the foregoing charge and the foregoing discharge was regarded as 1 cycle. Charge and discharge were repeated up to the 100th cycle. As the discharge capacity retention ratio (cycle characteristics), the ratio of the discharge capacity at the 100th cycle to the discharge capacity at the first cycle, that is, the discharge capacity retention ratio (%)=(discharge capacity at the 100th cycle/discharge capacity at the first cycle)*100 was calculated.

Procedures and conditions in examining the foregoing cycle characteristics were similar to those of evaluating the same characteristics in the after-mentioned examples.

Further, for the secondary batteries of Examples 1-1 to 1-27, the breakthrough prick test was performed in the following procedure. The results illustrated in Table 3 and Table 4 were obtained. In this case, samples provided with 100 cycles of charge and discharge under the foregoing charge and discharge conditions were again charged at the constant current of 0.2 C until the battery voltage reached 4.25 V under the environment of 23±3 deg C. Subsequently, in such a state, each approximate center of the package can 54 and the package cup 55 of the secondary battery was penetrated with an iron nail (φ4.5 mm). After 10 seconds, the surface temperature of the package can 54 was measured. In result, a secondary battery in which the surface temperature of the package can 54 was 90 deg C. or less was regarded as "○" and a secondary battery in which the surface temperature of the package can 54 was larger than 90 deg C. and 150 deg C. or less was regarded as "Δ." The prick rate was 100 nm/sec.

From the results of Table 3 and Table 4, it was found that in the case where the average diameter of the crystallites of the base material 51A was from 0.01 μm to 5 μm both inclusive, and the carbon content and the sulfur content were respectively 100 ppm or less as in Examples 1-1 to 1-4, 1-7 to 1-15, and 1-18 to 1-27, a comparatively high tensile strength and a comparatively low volume resistivity were obtained. However, in Example 1-5, since the average diameter of the crystallites was excessively small, the foil-like base material 51A was not obtained and thus each characteristics value was not able to be measured. In Example 1-6, since the average diameter of the crystallites was excessively large, the tensile strength was slightly lowered and the numerical value of the discharge capacity retention ratio was slightly low. In Example 1-17, since the carbon concentration was excessively high, a dense electrolytic copper foil was not obtained, and the numerical values of the tensile strength and the discharge capacity retention ratio were extremely low. Similarly, in Example 1-18, since the sulfur concentration was excessively high, a dense electrolytic copper foil was not obtained, and the numerical values of the tensile strength and the discharge capacity retention ratio were extremely low. Further, in Examples 1-6, 1-17, and 1-18, the numerical values of the volume resistivity were comparatively high. Accordingly, it was confirmed that according to the secondary battery of an embodiment of the invention, superior cycle characteristics and high safety were able to be secured.

Examples 2-1 to 2-6

Coin type secondary batteries were fabricated in the same manner as that of Example 1-1, except that the surface roughness (Rz value) of the anode current collector 51 was changed in the range from 3.1 μm to 5.3 μm both inclusive as illustrated in Table 5.

For the secondary batteries of Examples 2-1 to 2-6, the cycle characteristics were examined and prick test was performed. The results illustrated in Table 5 were obtained. Table 5 also illustrates the measurement results of each volume resistivity, each carbon content ratio, and each sulfur content ratio in each base material 51A (electrolytic copper foil) thereof.

TABLE 5

Anode active material: Si (electron beam evaporation method)
Tire profile of crystallite of anode current collector: 0.1 or less
Average diameter of crystallite of anode current collector: 0.1

|  | Surface roughness Rz (μm) | Carbon concentration (ppm) | Sulfur concentration (ppm) | Volume resistivity (μΩ * cm) | Tensile strength (N/mm2) | Prick test | Discharge capacity retention ratio (%) |
|---|---|---|---|---|---|---|---|
| Example 1-1 | 2.5 | 35 | 45 | 2.2 | 443 | ○ | 79 |
| Example 2-1 | 3.1 | 35 | 45 | 2.2 | 443 | ○ | 78 |
| Example 2-2 | 3.2 | 35 | 45 | 2.2 | 443 | ○ | 82 |
| Example 2-3 | 3.8 | 35 | 45 | 2.2 | 443 | ○ | 83 |
| Example 2-4 | 4.6 | 35 | 45 | 2.2 | 443 | ○ | 82 |
| Example 2-5 | 5.2 | 35 | 45 | 2.2 | 443 | ○ | 81 |
| Example 2-6 | 5.3 | 35 | 45 | 2.2 | 443 | ○ | 78 |

As illustrated in Table 5, it was found that in the case where the surface roughness Rz value of the anode current collector 1 was from 3.2 μm to 5.2 μm both inclusive (Examples 2-2 to 2-5), more superior cycle characteristics were obtained.

Example 3-1

A coin type secondary battery was fabricated in the same manner as that of Example 1-1, except that as a solvent, 4-fluoro-1,3-dioxolane-2-one (FEC) as one of cyclic ester carbonates having halogen shown in Chemical formula 5 was added instead of EC and VC, and the solvent composition (FEC:DEC) was changed to 50:50 at a weight ratio.

Example 3-2

A coin type secondary battery was fabricated in the same manner as that of Example 1-1, except that as a solvent, 4,5-difluoro-1,3-dioxolane-2-one (DFEC) as one of cyclic ester carbonates having halogen shown in Chemical formula 5 was added instead of VC, and the solvent composition (FEC:DEC:DFEC) was changed to 30:65:5 at a weight ratio.

Examples 3-3 and 3-4

Coin type secondary batteries were fabricated in the same manner as that of Example 3-2, except that sulfobenzoic anhydride (SBAH: Example 3-3) as an acid anhydride or sulfopropionic anhydride (SPAH: Example 3-4) as an acid anhydride was added to the electrolytic solution as an additive. At this time, the contents of SBAH and SPAH in the electrolytic solution was 1 wt %. "1 wt %" means that in the case where the whole solvent was regarded as 100 wt %, SBAH or SPAH was added at a portion corresponding to 1 wt % thereof.

Example 3-5

A coin type secondary battery was fabricated in the same manner as that of Example 6-2, except that lithium tetrafluoroborate (LiBF$_4$) was further added as an electrolyte salt, and the content of LiPF$_6$ was changed to 0.9 mol/kg and the content of LiBF$_4$ was changed to 0.1 mol/kg.

The cycle characteristics for the secondary batteries of Examples 3-1 to 3-5 were examined. The results illustrated in Table 6 were obtained.

TABLE 6

Anode active material: Si (electron beam evaporation method)
Tire profile of crystallite of anode current collector: 0.1 or less
Average diameter of crystallite of anode current collector: 0.1
Surface roughness of anode current collector: Rz = 2.5 μm

|  | Electrolytic solution | | | | | | | Discharge capacity retention ratio (%) |
|---|---|---|---|---|---|---|---|---|
|  | Solvent (wt %) | | | | | Electrolyte salt mol/kg | Others wt % |  |
|  | EC | DEC | FEC | DFEC | VC |  |  |  |
| Example 1-1 | 30 | 60 | — | — | 10 | LiPF$_6$: 1 | — | 79 |
| Example 3-1 | — | 50 | 50 | — | — | LiPF$_6$: 1 | — | 89 |
| Example 3-2 | 30 | 65 | — | 5 | — | LiPF$_6$: 1 | — | 91 |
| Example 3-3 | 30 | 65 | — | 5 | — | LiPF$_6$: 1 | SBAH: 1 | 90 |
| Example 3-4 | 30 | 65 | — | 5 | — | LiPF$_6$: 1 | SPAH: 1 | 92 |
| Example 3-5 | 30 | 65 | — | 5 | — | LiPF$_6$: 0.9 LiBF$_4$: 0.1 | — | 93 |

As illustrated in Table 6, it was found that in the case where FEC or DFEC was added as a solvent, the discharge capacity retention ratio was more improved. Further, in the case where SBAH or SPAH was added as an additive into the electrolytic solution (Examples 3-3 and 3-4), or in the case where $LiBF_4$ was added as an electrolyte salt (Example 3-5), a slightly higher discharge capacity retention ratio was obtained than in the case that any of the foregoing substance was not added (Example 3-2).

Examples 4-1 and 4-2

Coin type secondary batteries were fabricated in the same manner as that of Example 1-1, except that the formation method of the anode active material layer 52 was changed as illustrated in Table 7.

In Example 4-1, the anode active material layer 52 was formed by coating method. Specifically, first, silicon particles having an average particle diameter of 5 μm were prepared, and thermoplastic polyimide was prepared as a binder. Next, the silicon particles and the thermoplastic polyimide were mixed at a weight ratio of 7:2. The mixture was dissolved in N-methyl-2-pyrrolidone as a solvent and kneaded to form an anode mixture slurry. The anode current collector 51 was coated with the anode mixture slurry and the resultant was dried in the temperature atmosphere at 80 deg C., and heated at 500 deg C. for three hours, and thereby the anode active material layer 52 was formed. Meanwhile, in Example 4-2, the anode active material layer 52 was formed by spraying method. Specifically, silicon powder (median size: 30 μm) was prepared. The anode current collector 51 was sprayed with silicon powder (median size: from 1 μm to 300 μm both inclusive) in a molten state, and thereby the plurality of anode active material particles were formed. In the spraying method, gas frame spraying was used. Spraying treatment was provided at the spraying rate of about from 45 msec to 55 msec both inclusive, while cooling a platform with carbon dioxide to prevent the anode current collector 51 from getting thermal damage.

The cycle characteristics for the secondary batteries of Examples 4-1 and 4-2 were examined. The results illustrated in Table 7 were obtained.

TABLE 7

Anode active material: Si
Tire profile of crystallite of anode current collector: 0.1 or less
Average diameter of crystallite of anode current collector: 0.1
Surface roughness of anode current collector: Rz = 2.5 μm

|  | Formation method of anode active material layer | Discharge capacity retention ratio (%) |
|---|---|---|
| Example 1-1 | Electron beam evaporation method | 79 |
| Example 4-1 | Coating method | 74 |
| Example 4-2 | Spraying method | 79 |

Dfalt was found that based on the results of Table 7, cycle characteristics almost equal to those of the case of electron beam evaporation method were obtained as well with the use of coating method and spraying method.

Examples 5-1 to 5-3

Coin type secondary batteries were fabricated in the same manner as that of Example 1-1, except that the tire profile of the crystallites in the base material 51A was changed to fall within the numerical value illustrated in Table 9 by setting each composition of the plating bath and each current density in forming the base material 51A as illustrated in Table 8.

TABLE 8

| | Composition of plating bath | | | | | |
|---|---|---|---|---|---|---|
|  | $CuSO_4 \cdot 5H_2O$ ($g/dm^3$) | $H_2SO_4$ ($g/dm^3$) | CuCl ($g/dm^3$) | Additive 1 ($g/dm^3$) | Additive 2 ($g/dm^3$) | Current density ($A/dm^3$) |
| Example 1-1 | 300 | 180 | 0.005 | 0.005 | 0.007 | 5 |
| Example 5-1 | 300 | 150 | 0.005 | 0.005 | 0.007 | 4 |
| Example 5-2 | 300 | 140 | 0.005 | 0.005 | 0.007 | 3 |
| Example 5-3 | 300 | 130 | 0.005 | 0.005 | 0.007 | 3.5 |

Additive 1: polyethylene glycol
Additive 2: 3-3'-dithiobis (1-propanesulfonic acid) sodium For the secondary batteries of Examples 5-1 to 5-3, the cycle characteristics were examined and prick test was performed. The results illustrated in Table 9 were obtained. Table 9 also illustrates the measurement results of each volume resistivity, each carbon content ratio, and each sulfur content ratio in each base material 51A (electrolytic copper foil).

TABLE 9

Anode active material: Si (electron beam evaporation method)
Tire profile of crystallite of anode current collector: 0.1 or less
Average diameter of crystallite of anode current collector: 0.1

|  | Tire profile of crystallite | Carbon concentration (ppm) | Sulfur concentration (ppm) | Volume resistivity ($\mu\Omega * cm$) | Tensile strength (N/mm2) | Prick test | Discharge capacity retention ratio (%) |
|---|---|---|---|---|---|---|---|
| Example 1-1 | ≦0.1 | 35 | 45 | 2.2 | 443 | ○ | 79 |
| Example 5-1 | 0.1-0.3 | 35 | 45 | 2.1 | 413 | ○ | 74 |

TABLE 9-continued

Anode active material: Si (electron beam evaporation method)
Tire profile of crystallite of anode current collector: 0.1 or less
Average diameter of crystallite of anode current collector: 0.1

|  | Tire profile of crystallite | Carbon concentration (ppm) | Sulfur concentration (ppm) | Volume resistivity (μΩ * cm) | Tensile strength (N/mm2) | Prick test | Discharge capacity retention ratio (%) |
|---|---|---|---|---|---|---|---|
| Example 5-2 | 0.2-0.5 | 35 | 45 | 2.1 | 402 | ○ | 71 |
| Example 5-3 | 0.3-0.6 | 35 | 45 | 2.0 | 348 | ○ | 64 |

As illustrated in Table 9, it was confirmed that as the tire profile of crystallites was increased, the tensile strength tended to be lowered and the cycle characteristics tended to be deteriorated. Meanwhile, as the tire profile of crystallites was decreased, the value of the volume resistivity became slightly larger. That is, in the case where a carbon concentration and a sulfur concentration are the degrees with which the electrolytic copper foil is able to be formed, if the tire profile of crystallites is decreased, the cycle characteristics are able to be improved without largely increasing the volume resistivity.

In the foregoing embodiment and the foregoing examples, descriptions have been given of the battery in which lithium is used as an electrode reactant. However, the embodiment is able to be similarly applied to a case that other alkali metal such as sodium (Na) or potassium (K), an alkali earth metal such as magnesium or calcium (Ca), or other light metal such as aluminum is used. In this case, a cathode active material capable of inserting and extracting an electrode reactant and the like are selected according to the electrode reactant.

Further, description has been given with the specific examples of the secondary battery including a battery element (spirally wound electrode body) having the cylindrical or planular (oval) spirally wound structure or the coin type secondary battery. However, the embodiment is able to be similarly applied to a secondary battery including a battery element having a polygonal spirally wound structure, or a secondary battery including a battery element having other structure such as a structure in which a cathode and an anode are folded or a structure in which a plurality of cathodes and a plurality of anodes are layered. In addition, the embodiment is able to be similarly applied to a secondary battery having other package shape such as a square.

Further, the description has been given of the case using the liquid electrolytic solution as an electrolyte. However, a gel electrolyte in which an electrolytic solution is held by a support such as a polymer compound may be used. Examples of polymer compounds include polyacrylonitrile, polyvinylidene fluoride, a copolymer of vinylidene fluoride and hexafluoropropylene, polytetrafluoroethylene, polyhexafluoro propylene, polyethylene oxide, polypropylene oxide, polyphosphazene, polysiloxane, polyvinyl acetate, polyvinyl alcohol, polymethacrylic acid methyl, polyacrylic acid, polymethacrylic acid, styrene-butadiene rubber, nitrile-butadiene rubber, polystyrene, and polycarbonate. Specially, in terms of electrochemical stability, polyacrylonitrile, polyvinylidene fluoride, polyhexafluoro propylene, or polyethylene oxide is preferable. The ratio of the polymer compound to the electrolytic solution differs according to the compatibility, but in general, the amount of polymer compound corresponding to from 5 wt % to 50 wt % both inclusive of the electrolytic solution is preferably added.

Furthermore, in the foregoing embodiment and the foregoing examples, regarding the dimensions of crystallites and the surface roughness (Rz value) in the anode current collector of the secondary battery of the invention, the appropriate ranges thereof derived from the results of the examples have been described. However, such a description does not totally eliminate the possibility that each parameter may be out of the foregoing ranges. That is, the foregoing appropriate ranges are the range particularly preferable for obtaining the effects of the invention. Therefore, as long as effects of the invention are obtained, each parameter may be out of the foregoing range in some degrees.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An anode comprising:
   an anode current collector including an electrolytic copper foil which contains carbon and sulfur respectively having a content ratio of 100 ppm or less, and in which an average diameter of crystallites is from 0.01 μm to 5 μm both inclusive; and
   an anode active material layer provided on the anode current collector.

2. The anode according to claim 1, wherein the anode active material layer contains one or more selected from the group consisting of a simple substance and a compound of silicon as an anode active material.

3. The anode according to claim 1, wherein the anode active material layer is formed by vapor-phase deposition method.

4. A secondary battery comprising:
   a cathode;
   an anode; and
   an electrolyte,
   wherein the anode has an anode current collector and an anode active material layer provided on the anode current collector, and
   the anode current collector included an electrolytic copper foil which contains carbon and sulfur respectively having a content ratio of 100 ppm or less, and in which an average diameter of crystallites is from 0.01 μm to 5 μm both inclusive.

5. The secondary battery according to claim 4, wherein the electrolyte contains one or more of 4-fluoro-1,3-dioxolane-2-one and 4,5-difluoro-1,3-dioxolane-2-one as a solvent.

6. The secondary battery according to claim 4, wherein the electrolyte contains an electrolyte salt containing one or both of lithium hexafluorophosphate ($LiPF_6$) and lithium tetrafluoroborate ($LiBF_4$).

7. The secondary battery according to claim 4, wherein the electrolyte contains one or both of sulfobenzoic anhydride and sulfopropionic anhydride.

* * * * *